(12) United States Patent
Kakigahara et al.

(10) Patent No.: US 6,522,417 B1
(45) Date of Patent: Feb. 18, 2003

(54) COMMUNICATION TERMINAL DEVICE THAT PROCESSES RECEIVED IMAGES AND TRANSMITS PHYSICAL QUANTITIES THAT AFFECT THE RECEIVING COMMUNICATION TERMINAL DEVICE

(75) Inventors: Koji Kakigahara, Katano (JP); Shinichi Matsui, Kobe (JP); Yasuhiro Sakurai, Nishinomiya (JP)

(73) Assignee: Matsushita Electric Industrial Co., Ltd., Osaka-fu (JP)

(*) Notice: Subject to any disclaimer, the term of this patent is extended or adjusted under 35 U.S.C. 154(b) by 0 days.

(21) Appl. No.: 09/067,232

(22) Filed: Apr. 27, 1998

(30) Foreign Application Priority Data

Apr. 28, 1997 (JP) .............................................. 9-110849

(51) Int. Cl.⁷ .................... G06K 15/00; H04M 11/00
(52) U.S. Cl. ................. 358/1.15; 379/100.01
(58) Field of Search ................ 358/400, 401, 358/504, 406, 434, 1.15, 1.9, 1.18; 379/100.01; 455/557, 441, 550

(56) References Cited

U.S. PATENT DOCUMENTS

| | | | | |
|---|---|---|---|---|
| 4,769,833 A | | 9/1988 | Farleigh et al. ............. 379/105 |
| 5,382,943 A | * | 1/1995 | Tanaka ........................ 340/549 |
| 5,523,811 A | * | 6/1996 | Wada ........................... 354/76 |
| 5,615,384 A | | 3/1997 | Allard et al. ................ 395/800 |
| 5,652,919 A | * | 7/1997 | Itoh ............................. 396/33 |
| 5,734,933 A | * | 3/1998 | Sekiue ......................... 396/55 |
| 5,877,431 A | * | 3/1999 | Hirano ..................... 73/862.41 |
| 6,169,574 B1 | * | 1/2001 | Noguchi ...................... 348/208 |
| 6,212,381 B1 | * | 4/2001 | Oda ............................ 455/411 |
| 6,310,955 B1 | * | 10/2001 | Reeves ........................ 379/424 |
| 6,370,523 B1 | * | 4/2002 | Anderson .................. 379/88.2 |
| 2001/0012059 A1 | * | 8/2001 | Kudo .......................... 348/208 |
| 2002/0065104 A1 | * | 5/2002 | Hess et al. ................... 455/557 |

FOREIGN PATENT DOCUMENTS

| | | | | |
|---|---|---|---|---|
| DE | 3306452 | * | 8/1984 | ............ G09B/9/06 |
| EP | 0907278 | * | 4/1999 | ............ H04M/1/00 |
| JP | 401186066 A | * | 7/1989 | .......... H04N/5/225 |
| JP | 3270390 | | 12/1991 | ............ H04N/7/14 |
| JP | 405292167 A | * | 11/1993 | ............ H04M/1/03 |
| JP | 406014128 | * | 1/1994 | .......... H04M/11/00 |
| JP | 409135427 A | * | 5/1997 | ............ H04N/7/14 |
| JP | 9261299 | | 10/1997 | ............ H04M/1/00 |

* cited by examiner

Primary Examiner—Jerome Grant, II
(74) Attorney, Agent, or Firm—Price and Gess

(57) ABSTRACT

A sending communication terminal device includes a physical quantity detection sensor for detecting the physical quantities that affect the sending communication terminal device, and transmits the physical quantities as physical quantity data in a form to be distinguished from other types of data. The receiving communication terminal device extracts the physical quantity data from received data, analyzes the physical quantities, processes other kinds of received data or data that has been prepared in the receiving communication terminal device according to the analysis result, and outputs the processed data on the display.

19 Claims, 25 Drawing Sheets

FIG. 5

DATA STRUCTURE OF INFORMATION DATA

| INFORMATION DATA IDENTIFIER |
| --- |
| INFORMATION DATA LENGTH |
| INFORMATION DATA TYPE IDENTIFIER |
| INFORMATION DATA |
| |
| END-OF-DATA IDENTIFIER |

FIG. 6

DATA STRUCTURE OF PHYSICAL QUANTITY DATA

| PHYSICAL QUANTITIES IDENTIFIER |
| --- |
| PHYSICAL QUANTITY DATA LENGTH |
| DISCRETE PHYSICAL QUANTITIES IDENTIFIER |
| PHYSICAL-QUANTITIES-APPLIED DATA TYPE IDENTIFIER |
| PHYSICAL QUANTITY DATA |
| |
| END-OF-DATA IDENTIFIER |

FIG. 15
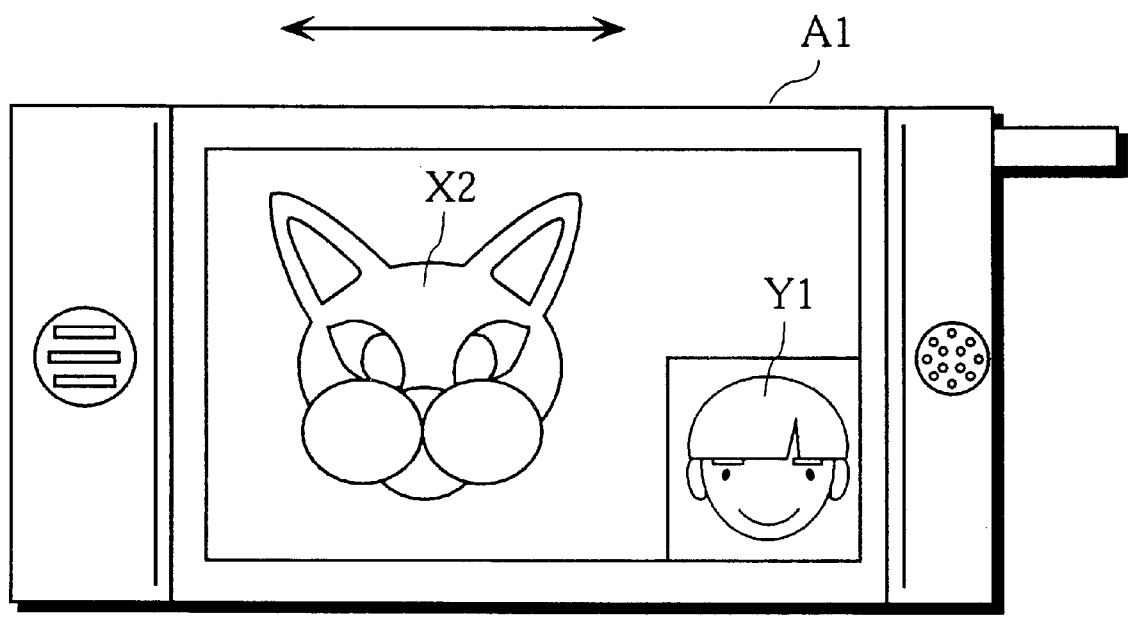
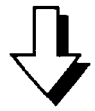
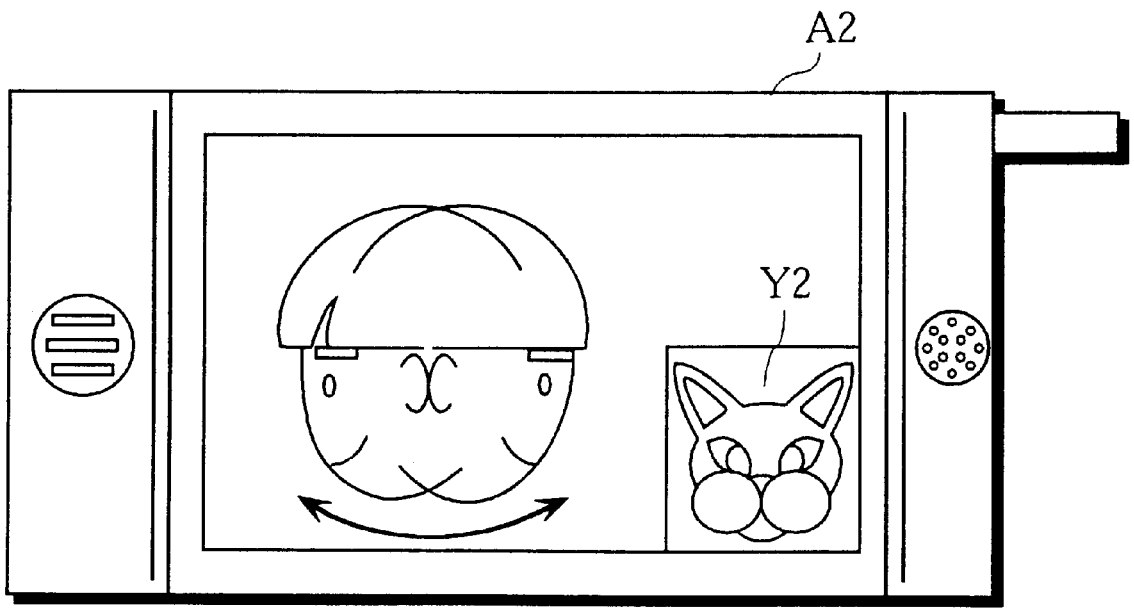

FIG. 17
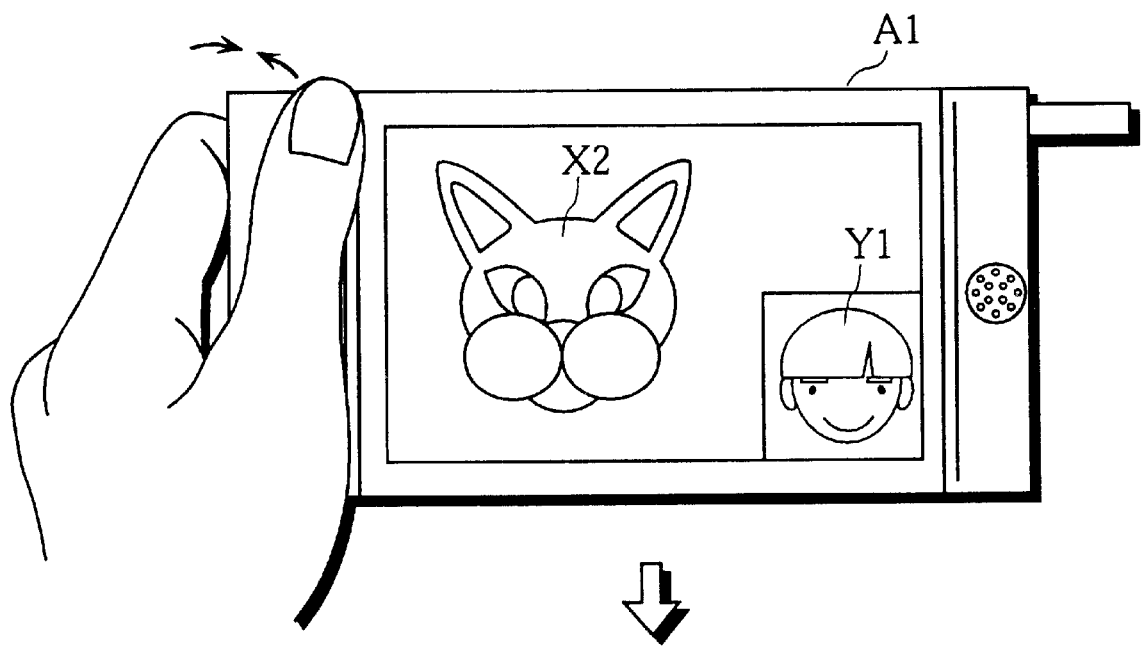
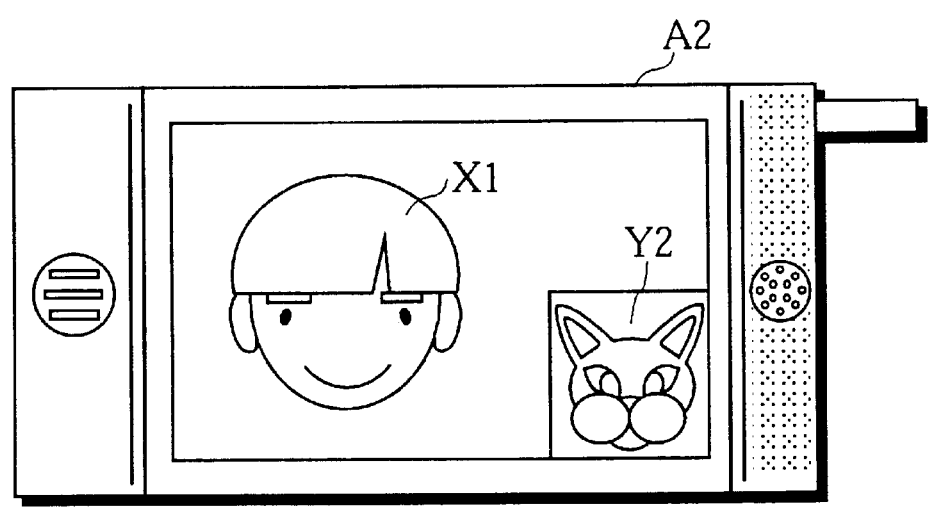

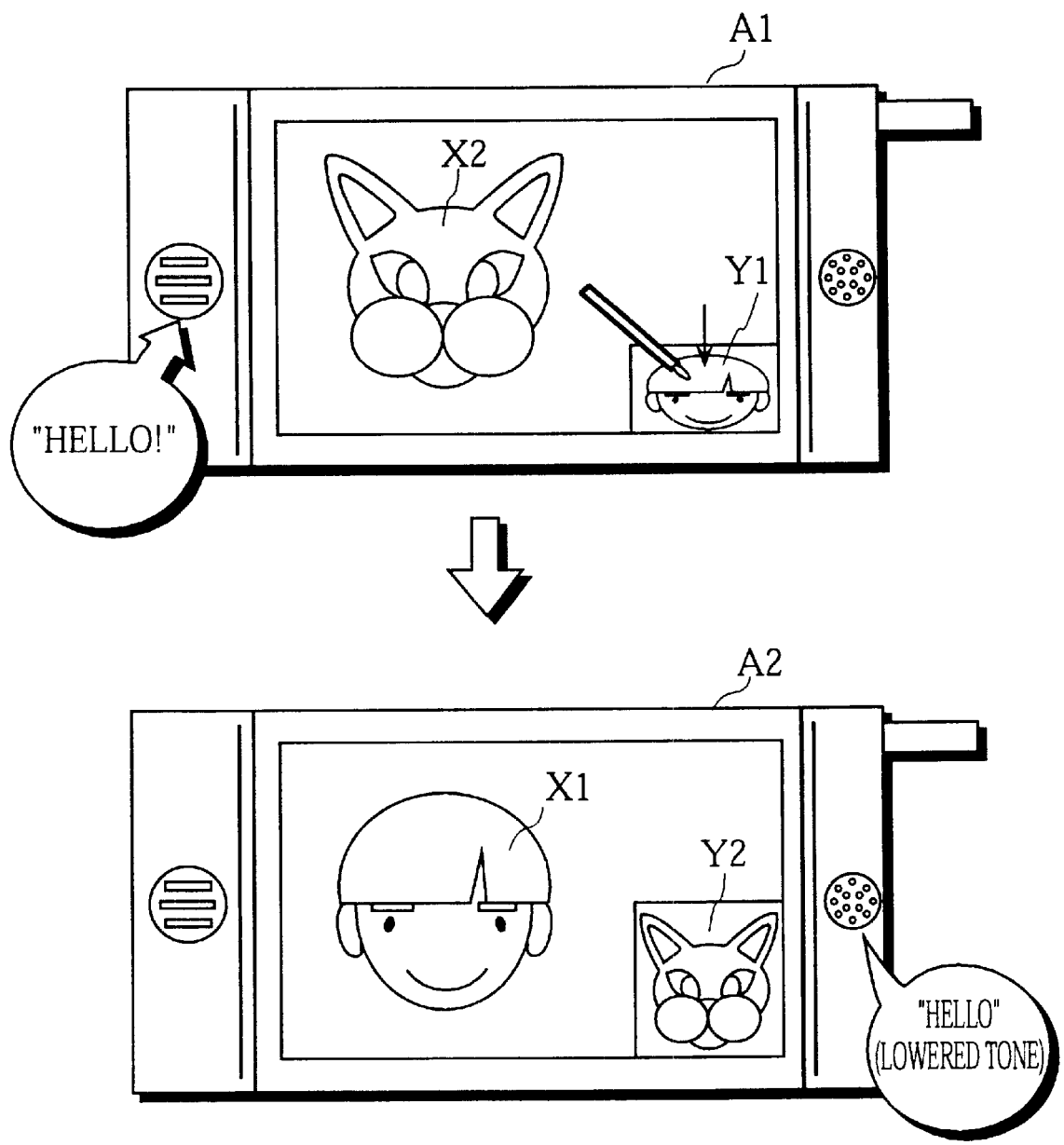

FIG. 26

DATA STRUCTURE OF INSTRUCTION DATA

| INSTRUCTION IDENTIFIER |
| --- |
| INSTRUCTION LENGTH |
| INSTRUCTION TYPE IDENTIFIER |
| INSTRUCTION |
| END-OF-INSTRUCTION-DATA IDENTIFIER |

COMMUNICATION TERMINAL DEVICE THAT PROCESSES RECEIVED IMAGES AND TRANSMITS PHYSICAL QUANTITIES THAT AFFECT THE RECEIVING COMMUNICATION TERMINAL DEVICE

BACKGROUND OF THE INVENTION

1. Field of the Invention

The present invention relates to a communication terminal device that transmits and receives data, and especially relates to a communication terminal device that transmits and receives physical quantities and image manipulations which affect the sending communication terminal device.

2. Related Art

It is possible to transmit and receive audio data, image data, text data, animation data, or the like in its original form using a conventional communication terminal device or a communication system, such as a telephone, facsimile, pager, computer communication system or the like.

With the recent growing demand for portable communication terminal devices and the recent developments in computer technology, it is possible for a portable computer terminal device to transmit and receive various kinds of data. In other words, a portable computer terminal device can achieve multimedia communication.

Conventional communication terminal devices have concentrated on the minimization of errors when mechanically transmitting information that represents the data that is to be transmitted to another communication terminal device.

As a result such conventional communication terminal devices are not able to transmit an action of the user of a sending communication terminal device and to have the user of the receiving communication terminal device act in response to the action of the sending communication terminal device user, for instance.

Actions of the user of the sending communication terminal device, however, can be a means to express an emotion of the sending communication terminal device user. When an action of the sending communication terminal device user can be transmitted to the receiving communication terminal device to have the receiving communication terminal device user act in response to the action, the communication between the sending communication terminal device user and the receiving communication terminal device user may be diversified.

SUMMARY OF THE INVENTION

An object of the present invention is to provide a communication terminal device that efficiently diversifies the communication between the sending communication terminal device user and the receiving communication terminal device user.

Another object of the present invention is to provide a new communication terminal device that conveys the actions of the sending communication terminal device user reflecting his/her emotions in the manners that appeal to the senses, especially to the visual sense, of the receiving communication terminal device user.

A further object of the present invention is to provide a communication terminal device that converts physical actions taken by the sending communication terminal device user to non-physical ones to be displayed to the receiving communication terminal device user.

Yet another object of the present invention is to provide a communication terminal device available for the two-way communication in which two communication terminal devices transmit the actions taken by the users to each other.

A still further object of the present invention is to provide a communication terminal device that transmits the information reflecting the actions of the sending communication terminal devices user and the receiving communication terminal device user without requiring large amount of transmission capacity.

An additional object of the present invention is to provide a communication system where the actions taken by the sending communication terminal device user is transmitted to and displayed on the receiving communication terminal device.

The above-described objects are realized by the combination of the sending communication terminal device and the receiving communication terminal device described below.

The sending communication terminal device is a sending communication terminal device that transmits data to a receiving communication terminal device, including: a detection unit for detecting physical quantities that affect one of a main body of the sending communication terminal device and a part of the sending communication terminal device; a preparation unit of preparing one of target data that is to be processed with the physical quantities detected by the detection unit and an identifier for identifying the target data; and a transmission unit for transmitting the physical quantities and one of the target data and the identifier prepared by the preparation unit in a form that enables the physical quantities and one of the target data and the identifier to be identified.

The sending communication terminal device may be the sending communication terminal device, wherein the transmission unit includes a link information addition unit for adding link information, which relates the physical quantities with the target data, to at least the physical quantities.

The sending communication terminal device may be the sending communication terminal device, wherein the detection unit includes: an action detection sensor for detecting an action that is performed by a user of the sending communication terminal device on one of a main body of the sending communication terminal device and a part of the sending communication terminal device; and a physical quantity data output unit for creating data relating to an action type and a direction using signals detected by the action detection sensor and for outputting the created data.

The sending communication terminal device may be the sending communication terminal device further including a display for displaying an image that is the target data that is to be processed with the physical quantities, wherein the detection unit includes a touch panel that is provided on the display, and a processing circuit that detects an action performed by the user of the sending communication terminal device on the touch panel and interprets the detected action performed by the user as one of pressing, stroking, and rubbing.

The sending communication terminal device may be the sending communication terminal device, wherein the target data is symbol image data that metaphorically represents a user of the sending communication terminal device, and the preparation unit includes a storage unit for storing the symbol image data.

The sending communication terminal device may be the sending communication terminal device, wherein the symbol image data is three-dimensional image data, and the transmission unit performs a process by which the three-dimensional image data is transmitted at a beginning of communication with the receiving communication terminal device.

The receiving communication terminal device is a receiving communication terminal device that receives data transmitted from a sending communication terminal device, including: a reception unit for receiving the data transmitted from the sending communication terminal device; a division unit for grouping the data transmitted from the sending communication terminal device into a first data that represents physical quantities detected by the sending communication terminal device and a second data that is to be processed with the physical quantities; a processing unit for processing the second data according to the first data; and an expressing unit for expressing for a user of the receiving communication terminal device the second data after the processing by the processing unit.

The receiving communication terminal device may be the receiving communication terminal device, wherein the division unit includes a data type judgement unit for detecting identifiers that are added to the data transmitted from the sending communication terminal device, and for distinguishing the first data and the second data based on the detected identifiers.

The receiving communication terminal device may be the receiving communication terminal device, wherein the processing unit includes: an analysis unit for analyzing the first data that affects the sending communication terminal device to detect a type of the physical quantities; and a processing unit for processing the second data according to an analysis result of the analysis unit.

The receiving communication terminal device may be the receiving communication terminal device, wherein the second data obtained from the grouping by the division unit includes audio data and image data, the audio data is voice of a user of the sending communication terminal device, the image data is symbol image data that metaphorically represents the user of the sending communication terminal device, the analysis unit analyzes the first data to determines that the physical quantities that affect the sending communication terminal device are for a vibration and or a swing, the processing unit refers to an analysis result of the analysis unit, adds vibrato to the audio data, and shakes a head of the symbol image data of the sending communication terminal device user in one of vertical and horizontal directions, according to the result and the expressing unit includes a loudspeaker that emits the audio data after processing by the processing unit and a display that displays the image data after processing by the processing unit.

The receiving communication terminal device may be the receiving communication terminal device, wherein the symbol image data of the sending communication terminal device user is three-dimensional image data, the processing unit includes: an image data creation unit for creating variations of the image data seen from a plurality of camera angles using the three-dimensional image data; and a selection unit for selectively outputting the variations of the image data one at a time to the display according to the analysis result of the analysis unit.

The receiving communication terminal device may be a receiving communication terminal device that receives data transmitted from a sending communication terminal device including: a reception unit for receiving the data transmitted from the sending communication terminal device; a data type judgement unit for detecting identifiers that are added to the data transmitted from the sending communication terminal device, and for distinguishing first data the represents physical quantities and second data that is other data, based on the detected identifiers; a to-be-processed data extraction unit for detecting link information included in at least one of the first data and the second data, and extracting data, from the second data, which is related to the first data by the link information; a processing unit for processing the extracted data with the first data; and an expressing unit for expressing for a user of the receiving communication terminal device the extracted data after processing by the processing unit.

The receiving communication terminal device may be a receiving communication terminal device that receives data transmitted from a sending communication terminal device including: a reception unit for receiving the data transmitted from the sending communication terminal device; a division unit for grouping the data transmitted from the sending communication terminal device into a first data that represents physical quantities detected by the sending communication terminal device and a second data that specifies data that is to be processed with the physical quantities; a storage unit for storing the data to be processed; a processing unit for extracting the data that is to be processed and is specified by the second data, and for processing the extracted data according to the first data; and an expressing unit for expressing for a user of the receiving communication terminal device the extracted data after the processing by the processing unit.

The above-described objects are also realized by a communication terminal device that performs two-way communication with another communication terminal device including: a display; a physical quantity detection unit for detecting an action performed on a first image that is displayed on the display to create first operation data, and for detecting an action performed on a second image that is displayed on the display to create second operation data; a preparation unit for preparing at least one of image data and audio data corresponding to at least one of the first and the second images; a transmission unit for transmitting the first operation data, the second operation data, and a preparation data in a form which enables each of the first operation data, the second operation data, and the preparation data to be identified; a reception unit for receiving data transmitted from the other communication terminal device; a data judgement unit for judging that the data transmitted from the other communication terminal device is one of received first operation data, received second operation data, and received preparation data; a first processing unit for processing the received preparation data that is received by the reception unit according to the received first operation data; a second processing unit for processing the received preparation data that is received by the reception unit according to the received second operation data; an activation unit for selectively activating one of the first processing unit and the second processing unit according to a result obtained by the data type judgement unit; a display control unit for having, when the preparation data that is processed by one of the first processing unit and the second processing unit is image data, a corresponding image on the display replaced with contents of the preparation data; and a sound emission unit for emitting the contents of the preparation data when the preparation data that is processed by one of the driven first processing unit and the second processing unit is audio data.

The communication terminal device may be the communication terminal device, wherein the first image represents a user of the communication terminal device, and the second image represents a user of the other communication terminal device.

The communication terminal device may be the communication terminal device, wherein the image data prepared by the preparation unit is three-dimensional image data of a symbol image that metaphorically represents the user of the communication terminal device.

BRIEF DESCRIPTION OF THE DRAWINGS

These and other objects, advantages and features of the invention will become apparent from the following description thereof taken in conjunction with the accompanying drawings which illustrate a specific embodiment of the invention. In the Drawings:

FIG. 5 shows the data structure of information data that the communication terminal devices transmit and receive;

FIG. 6 shows the data structure of physical quantities data that the communication terminal devices transmit and receive;

FIG. 15 shows a typical example of the corresponding actions performed by the communication terminal devices when the sending communication terminal device is swung in the horizontal direction;

FIG. 17 shows a typical example of the corresponding actions performed by the communication terminal devices when pressure is applied to the sending communication terminal device;

FIG. 21 shows a typical example of the corresponding actions performed by the communication terminal devices when the height of the symbol image of the sending communication terminal device user displayed on the sending communication terminal device is decreased;

FIG. 26 shows the data structure of the instruction data that the communication terminal devices transmit and receive.

DESCRIPTION OF THE PREFERRED EMBODIMENTS

Figure 1:
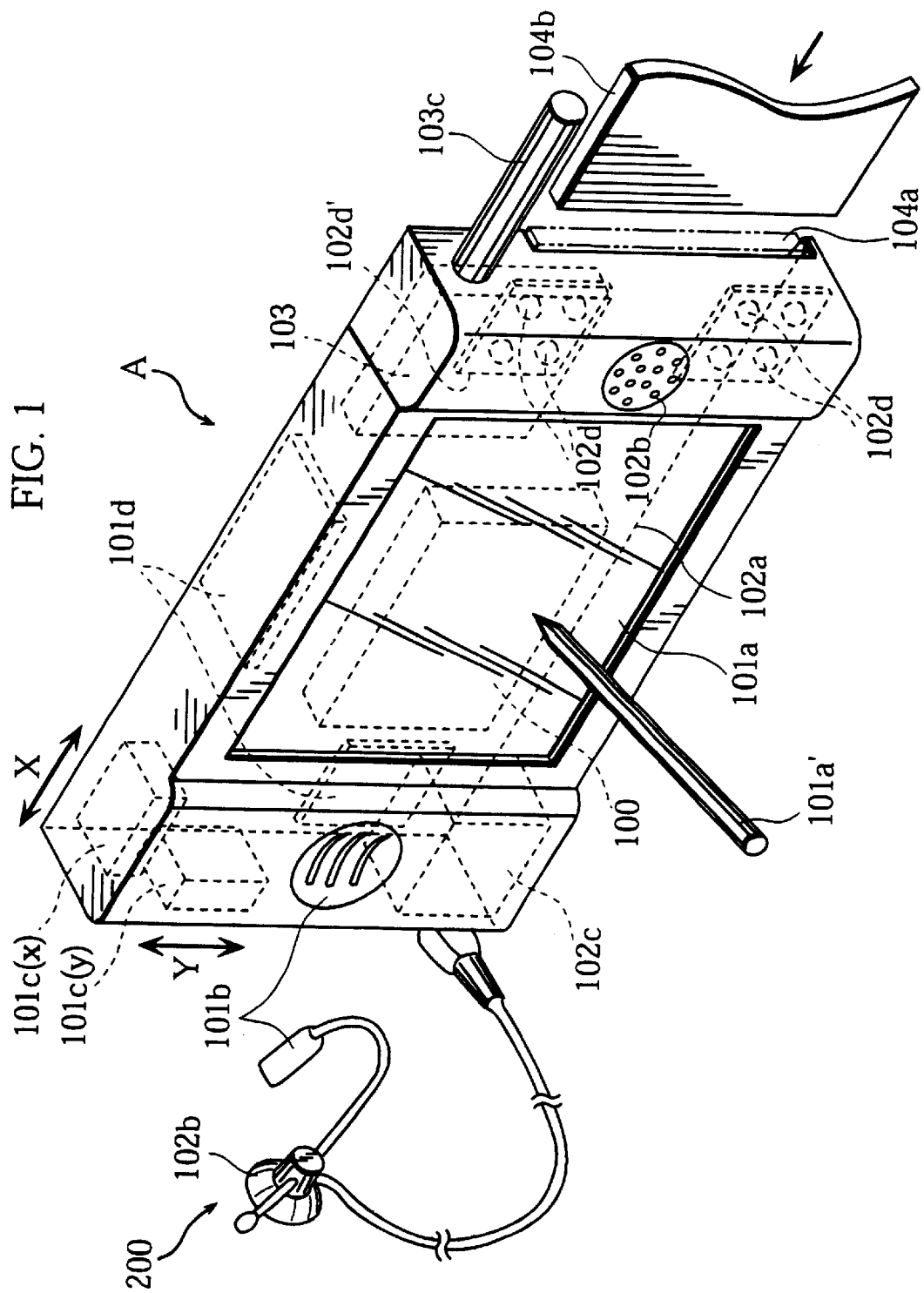
FIG. 1 is a perspective drawing of the portable communication terminal device according to the first embodiment of the present invention.
Figure 2:
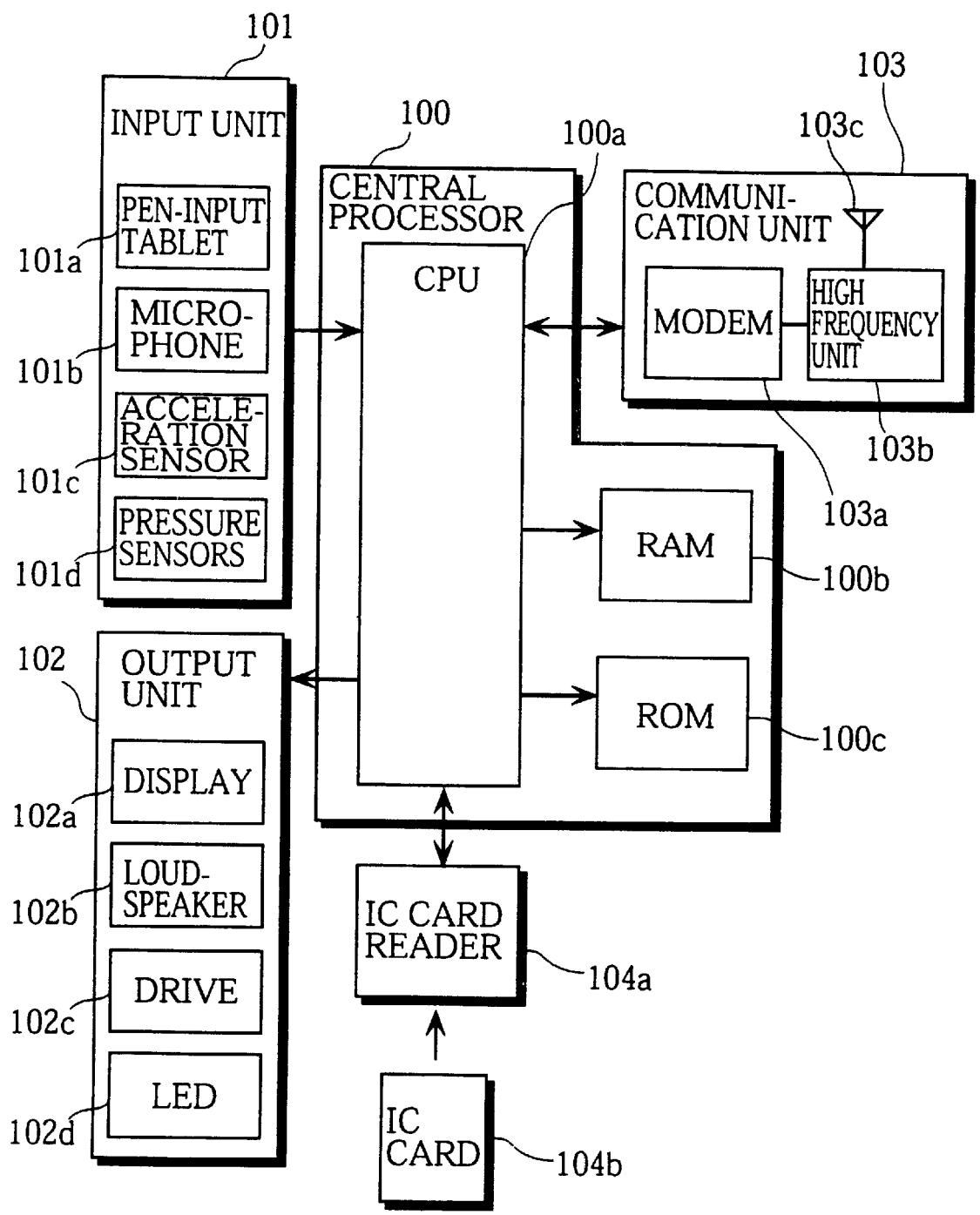
FIG. 2 shows a hardware construction of the portable communication terminal device according to the first embodiment of the present invention.

The following is the explanation of the first embodiment of the present invention with reference to the figures. FIG. 1 is a perspective drawing of portable communication terminal device A according to the present embodiment of the invention. FIG. 2 is a hardware configuration of portable communication terminal device A. Portable communication terminal device A includes central processor 100, pen-input tablet 101a, microphone 101b, acceleration sensor 101c, pressure sensors 101d, display 102a, loudspeaker 102b, drive 102c, LEDs (light emitting diode) 102d, communication unit 103, and IC (integrated circuit) card reader 104a as its main components.

Central processor 100 includes CPU (central processing unit) 100a for performing operations, RAM (random access memory) 100b that is a work storage, and ROM (read only memory) 100c for storing the program for data processing and communication.

Pen-input tablet 101a, microphone 101b, acceleration sensor 101c, and pressure sensors 101d are included in input unit 101. Pen-input tablet 101a is formed over display 102a. As a result, when one point on pen-input tablet 101a is pressed with pen 101a', the coordinates of this point on display 102a may be input in central processor 100. More specifically, when a character or a figure is input using pen-input tablet 101a and central processor 100, the character or the figure may be decoded. When pen 101a' is used to press pen-input tablet 101a or is dragged across pen-input tablet 101a, this physical action by the user may be detected as "stroke data". Instructions about an action such as increasing or decreasing the height of the image on display 102a are also input. Microphone 101b transforms audio data into electrical signals. The audio data is digitized in a following process.

Acceleration sensor 101c is, for instance, a servo-type sensor or an electrostatic-capacity-type sensor. Two acceleration sensors 101c(x) and 101c(y) are included in portable communication terminal device A as shown in FIG. 1, and detect the acceleration of portable communication terminal device A in the X-axis direction and in the Y axis direction respectively.

Pressure sensors 101d, which can be one of various kinds of sensor, detects pressure by detecting the pressure applied to portable communication terminal device A using a distortion gauge in this specification. Pressure sensors 101d are placed at the positions at which pressure is applied by the user's hands when the user holds portable communication terminal device A in the hands.

Input unit 101 that is described above can of course include other input means, such as a keyboard, a scanner, and a camera.

Display 102a, loudspeaker 102b, drive 102c, and LEDs 102d are included in output unit 102. Display 102a displays an image, text, or a menu. Loudspeaker 102b outputs audio data. Drive 102c vibrates when driven by a motor and vibrates portable communication terminal device A. LEDs 102d are formed of adjacent arrays of red and green LEDs so that different colors may be displayed as a combination of red and green. Component 102d' that covers LEDs 102d is translucent to allow the light emitted from LEDs 102d to pass.

Microphone 101b and loudspeaker 102b are built into the main body of portable communication terminal device A, and are also provided on headset 200. Headset 200 is connected to portable communication terminal device A by a cord. The user wearing headset 200 may listen to audio data output from loudspeaker 102b or input audio data with microphone 101b, while holding portable communication terminal device A in the hands and watching display 102a or operating pen-input tablet 101a.

Communication unit 103 converts data into the signals to be transmitted, and includes modem 103a for converting transmitted signals to be processed by central processor 100, high frequency unit 103b for processing signals to be transmitted and received, and antenna 103c for transmitting and receiving signals. IC card reader 104a reads data from IC card 104b that stores data including programs, and transmits the data to central processor 100.

Portable communication terminal device A may be functionally divided into transmission system 1 and reception system 2. A functional block diagram of transmission system 1 and reception system 2 is shown in FIG. 3.

Figure 3:
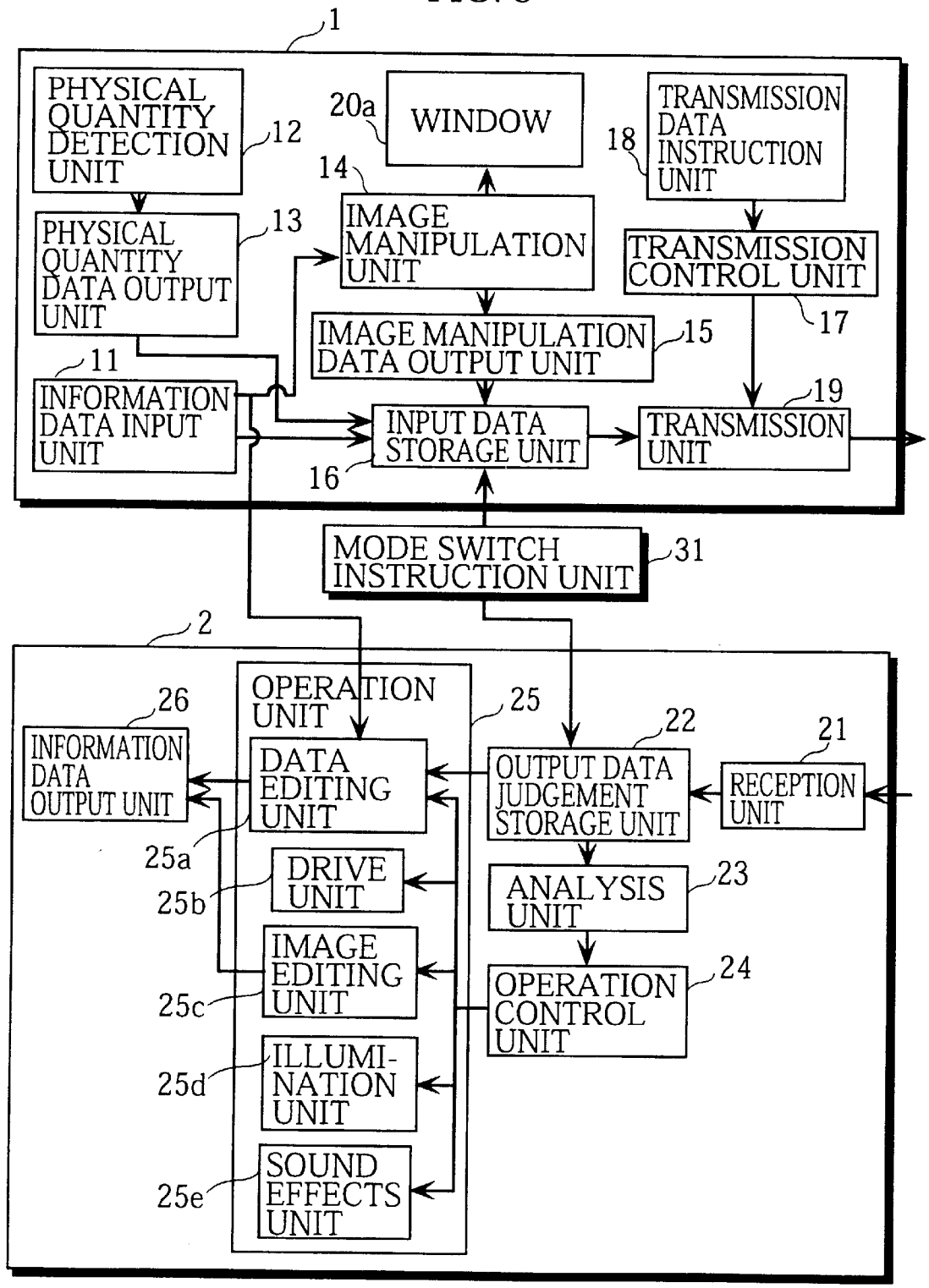
FIG. 3 is a functional block diagram of the portable communication terminal device according to the first embodiment of the present invention.

Mode switching direction unit 31 in FIG. 3 functions in both transmission system 1 and reception system 2. Mode switching direction unit 31 gives indication for switching the present mode of portable communication terminal device A and the other communication terminal device that maintains communication with portable communication terminal device A. In the present example, "consecutive operation mode", "regular mode", and "video, still picture, or text display mode" are the available modes. "Consecutive operation mode" is a mode that will be described later where a series of operations is consecutively performed by the receiving communication terminal device as shown in FIG. 22. "Regular mode" is a mode in which symbol images that represent the users of the two communication terminal devices are exchanged and audio communication is mainly performed, with the symbol images being displayed on each of the displays as shown in FIG. 4. "Video, still picture, and text display mode" is a mode in which symbol images are not displayed even if an image has been transmitted from the other communication terminal device or has already been stored in the memory, and in which animation data, still picture data, or text data that is transmitted from the other communication terminal device is displayed. The mode is switched using the mode switch screen that appears on the display when the user presses a predetermined point on pen-input tablet 101a. Mode switch instructions are to be transmitted from transmission system 1 to the other communication terminal device as instruction data.

Transmission system 1 includes information data input unit 11, physical quantity detection unit 12, physical quantity data output unit 13, image manipulation unit 14, image manipulation data output unit 15, input data storage unit 16, transmission control unit 17, transmission data instruction unit 18, transmission unit 19, and window 20a.

Information data input unit 11 accepts multimedia data input. More specifically, information data input unit 11 accepts audio data, text data, still picture data, animation data, and symbol images that metaphorically represent the users. Audio data is input with microphone 101b. Text data, still picture data, animation data, and symbol image data is input with pen-input tablet 101a or IC card reader 104a. In this specification symbol image data is three-dimensional image data to enable the receiving communication terminal data to easily create and show wide variations of symbol images using the transmitted symbol image data, and to minimize the amount of data transmitted to the receiving communication terminal device.

Physical quantity detection unit 12 detects physical quantities that affect portable communication terminal device A, and includes acceleration sensor 101c for measuring the acceleration in the vertical and horizontal directions for entire portable communication terminal device A, and pressure sensors 101d for measuring the pressure applied to portable communication terminal device A. Other kinds of physical quantities, such as rotation frequencies and angular acceleration, impact that portable communication terminal device A receives, temperature, illuminance, and atmospheric pressure may be detected with a variety of well-known sensors.

Physical quantity data output unit 13 outputs the information of the detected physical quantities as physical quantity data based on the detection result of physical quantity detection unit 12. More specifically, physical quantity data output unit 13 analyzes parameters, calculates the numerical value of predetermined physical quantities, and digitizes the numerical values to be processed by CPU 100a. In this specification, physical quantity data output unit 13 integrates the detection result by acceleration sensor 101c to calculate the moving speeds of portable communication terminal device A in the vertical and horizontal directions, calculates the amount of pressure applied to portable communication terminal device A using the detection result of pressure sensors 101d, digitizes the moving speeds and the amount of pressure, and inputs the digitized data into input data storage unit 16.

Window 20a shows the image on which actions are performed in image manipulation unit 14, and appears in a predetermined area on display 102. While the images that represent the users of the sending and receiving communication terminal devices are symbol images in this specification (refer to FIG. 4), other images such as text images may be used. The symbol image that represents the user of the communication terminal device itself is created using the data input by information data input unit 11. The symbol image shown on the display or the window is a front view of a three-dimensional image with a camera set in front of the image. The symbol image of the other communication terminal device user is transmitted to the communication terminal device at the beginning of the communication, more specifically, just before the connection, and is shown on the window of the communication terminal device. The image shown on the window of the communication terminal device is edited by the image editing unit (described later) in reception system 2, and shows variations according to the physical quantity data transmitted from the other communication terminal device. It is of course possible for the communication terminal device to store the symbol images of the users of the other communication terminal devices and the communication terminal device itself, so that when these communication terminal devices start the communication, it is possible to detect the symbol image of the other communication terminal device user using the identifier of the other communication terminal device and to show the symbol image on the window of the communication terminal device.

Image manipulation unit 14 performs certain actions on the image shown on window 20a. The certain actions here include pressing and stroking the symbol image of the receiving communication terminal device user by pressing and stroking pen-input tablet 101a, which is provided on display 102a, with the point of pen 101a', and to move the point of pen 101a' on the surface of pen-input tablet 101a up or down with pressing the head of the image. When the user moves the point of pen 101a' up with pressing the head of the image with the point of the pen, central processor 100 interprets the move as the input of instructions. As a result, the height of the symbol image shown on window 20a increases. When the user moves the point of pen 101a' down with pressing the head of the image with the point of the pen, the height of the symbol image shown on window 20a decreases in the same manner. Such image processing in which the height of the symbol image changes is performed in image manipulation unit 14 into which the data of the symbol image is input from information data input unit 11. The image processing is realized using well known techniques. The following is an explanation of one example of such an image processing method. First, two-dimensional image data is extracted from the data of the three-dimensional symbol image, and the ratio of the Y coordinate of each point of the two dimensional image data to the Y coordinate of the initial point of the point of pen 101a' is calculated. Then the amount of shift of the Y coordinate of each point is obtained by multiplying the calculated ratio of each point by the amount of shift of pen 101a' moved from the initial point, and the obtained amount of shift is added to the value of Y coordinate of each point. As a result, the height of the image may increase or decrease. Other actions may be performed on the image shown on window 20a. For instance, another image may be added to the image, part of the image may be deleted, or the image may be replaced by a newly input image.

Image manipulation data output unit 15 outputs the information about the action performed on the image in image manipulation unit 14 as image manipulation data. More specifically, when a predetermined action is performed on the image in image manipulation unit 14, image manipulation data output unit 15 outputs the code sequence corresponding to the action as image manipulation data.

For instance, code "00" represents an action in which the sending communication terminal device user presses the image of the receiving communication terminal device user with the point of pen 101a', and code "01" represents an action in which the sending communication terminal device user strokes the image of the receiving communication terminal device user with the point of pen 101a'. Code "10" represents an action in which the sending communication terminal device user presses the head of the image of the sending communication terminal device user with the point of pen 101a' and moves the point of the pen up, and code "11" represents the action in which the sending communication terminal device user presses the head of the image of the sending communication terminal device user with the point of pen 101a' and moves the point of the pen down. A header that indicates that the data is image manipulation data is added to each piece of the code, and the code with the header is output as image manipulation data. In this process when a certain period of time has passed after the completion of one of the above-mentioned image manipulations by the sending communication terminal device user, image manipulation data output unit 15 outputs a reset signal to inform the receiving communication terminal device user of the completion of the image manipulation. Such image manipulation data is detected when a physical action is performed on portable communication terminal device A, that is, when pen-input tablet 101a is pressed or stroked with pen 101a', so that the image manipulation data is a kind of physical quantity data in a broad sense.

Input data storage unit 16 is composed of RAM 104 and stores the data output from information data input unit 11, physical quantity data output unit 13, and image manipulation data output unit 15, in addition to the mode switch instruction data output from mode switch instruction unit 31. FIGS. 5 and 6 show the data structure of the information data and physical quantity data stored in input data storage unit 16. The symbol image data in the information data is three-dimensional data and is separately shown in FIG. 7. As a result, the information data in the data structure of FIG. 5 shows information data apart from symbol image data. The data structure of instruction data such as mode switch instructions is shown in FIG. 26.

The data structure of the information data is shown in FIG. 5. The information data includes an "information data identifier", an "information data length", an "information data type identifier", "information data", and an "end-of-data identifier". The "information data identifier" is the identifier by which information data is distinguished from other kinds of data such as physical quantity data and symbol image data. The "information data length" shows the data length of the "information data". The data amount of the "information data" is equal to the amount of data included in one transmission. For information data that is communicated in real time, such as audio data, audio data with a very short reproduction time is included in one transmission unit. Still picture data and animation data is also transmitted in real time, so that the amount of data included in one transmission unit is also very small. On the other hand, in the case of symbol image data that is transmitted in one lump at the beginning of communication, the amount of data included in one transmission is relatively large.

The "information data type identifier" indicates that the following "information data" is audio data, text data, animation data, or still picture data. The "end-of-data identifier" indicates the end of the unit of information data.

The data structure of the physical quantity data is fundamentally the same as that of the information data, and is shown in FIG. 6. Physical quantity data includes a "physical quantities identifier" for indicating that the data is physical quantity data, a "physical quantity data length" for showing the data length of the following "physical quantity data", a "discrete physical quantities identifier" for indicating the type of the "physical quantity data", that is, for indicating that the "physical quantity data" is acceleration data in the X-axis, acceleration data in the Y-axis, pressure data, temperature data, or humidity data, "physical quantity data", and an "end-of data identifier" for indicating the end of the unit of physical quantity data. The data structure of the physical quantity data differs from that of the information data in including a "physical-quantities-applied data type identifier", which indicates the type of information data to which the following "physical quantity data" is to be applied. For instance, when the "physical quantity data" is acceleration data, "the symbol image of the sending communication terminal device user" is indicated by the "physical-quantities-applied data type identifier". As a result, the reception system in the receiving communication terminal device processes the symbol image of the sending communication terminal device user and shows the symbol image that shakes or nods its head on the display of the receiving communication terminal device (refer to FIGS. 15 and 16). The data structure of image manipulation data, which is described above, is the same as that of physical quantity data.

Figure 7:
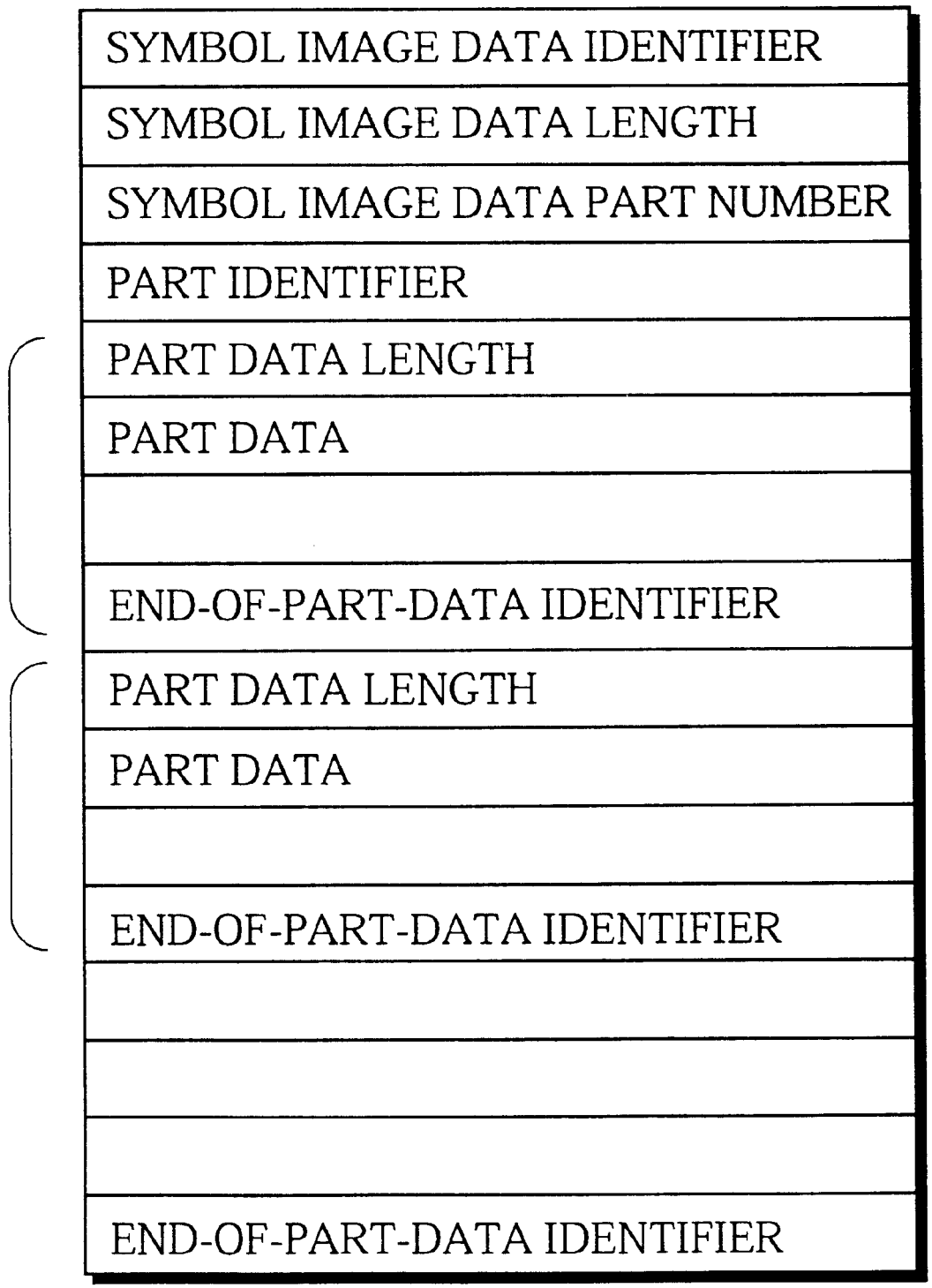
FIG. 7 shows the data structure of symbol image data that the communication terminal devices transmit and receive.

The data structure of symbol image data is fundamentally the same as that of information data. The data structure of symbol image data differs from that of information data in including a "part data length", "part data", and an "end-of-part-data identifier" for each component of a three-dimensional image and in describing each of the parts between "part identifier" and an "end-of-part-data identifier" as shown in FIG. 7. This is because symbol image data is transmitted in one lump at the beginning of communication as described above.

The data structure of instruction data is also fundamentally the same as that of information data in including an "instruction identifier" at the start of the structure for indicating that the data is instruction data, an "instruction length" just after the "instruction identifier" for showing the length of the "instruction", and an "end of instruction-data identifier" in the end of the construction for indicating the end of the data as shown in FIG. 26. The "instruction type identifier" included in the data structure of instruction data indicates whether the "instruction" is a mode switch instruction. When the "instruction" is always a mode switch instruction, the "instruction type identifier" need not be included in the data structure of instruction data.

In FIG. 3, transmission data instruction unit 18 receives the instructions about the data to be transmitted and not to be transmitted from the user. The data that is instructed to be transmitted by the user is animation data, still picture data, and text data in the information data. The remaining information data, which is to say, the audio data is transmitted without instructions from the user. The data whose transmission can be stopped is physical quantity data and image manipulation data.

Transmission control unit 17 controls the order and the timing of data transmission when the data stored in input data storage unit 16 is transmitted, and in the present embodiment controls the transmission order of information data and other kinds of data in accordance with a predetermined rule.

More specifically, when information data, physical quantity data, and image manipulation data are stored in input data storage unit 16, in principle the information data is transmitted first. When audio data that is a kind of information data and moving speed data that is a kind of physical quantity data are stored in input data storage unit 16, however, the physical quantity data is divided into a plurality of parts to be inserted between the pieces of the audio data without disturbing the natural flow of the sound. When audio data that is a kind of information data and image manipulation data including code "10" or "11" are stored in input data storage unit 16, the image manipulation data is transmitted first and then the audio data is transmitted. The reset signal of image manipulation data is dealt with in the same way as image manipulation data including code "00" or "01".

When physical quantity data or image manipulation data is stored in input data storage unit 16 and information data is being preferentially transmitted, if the transmission time of the information data exceeds a predetermined period of time, the data transmission of the information data may be temporarily suspended to transmit the physical quantity data or the image manipulation data stored in input data storage unit 16. The interrupted information data transmission may then be resumed. When instruction data is stored in input data storage unit 16, the transmission of the instruction data precedes any other data.

Transmission unit 19 includes communication unit 103 and transmits the data stored in input data storage unit 16 to the other portable communication terminal device under the control of transmission control unit 17. It is convenient for the user of portable communication terminal device A to use a public network such as that used by the PHS (personal handyphone system) as the communication channel linking the user to other communication terminal devices so that the user may communicate with all the subscribers of the public network.

The following is an explanation of reception system 2. Reception system 2 includes reception unit 21, output data judgement storage unit 22, analysis unit 23, operation control unit 24, operation unit 25, and information data output unit 26.

Reception unit 21 includes communication unit 103 and receives the information data, the physical quantity data, the image manipulation data, and the instruction data transmitted from the other portable communication terminal device. Output data judgement storage unit 22 searches the identifier at the start of the data structure of the data received by reception unit 21, judges whether the received data is information data, physical quantity data, image manipulation data, symbol image data, or instruction data, and temporarily stores the different types of received data separately. Information data or symbol image data is transferred to data editing unit 25a, and physical quantity data, image manipulation data, or instruction data is transferred to analysis unit 23.

Analysis unit 23 analyzes the received physical quantity data or image manipulation data to obtain the physical quantities or the actions performed on the images, and interprets the instructions in the received instruction data.

More specifically, analysis unit 23 analyzes moving speed data in the vertical and horizontal directions, and judges whether the motion of the sending communication terminal device is reciprocating motion in the vertical or horizontal directions and whether the cycle of the motion is shorter than a predetermined period of time. When judging that the cycle of the motion is shorter than the predetermined period of time, analysis unit 23 judges that the sending communication terminal device is vibrating. When judging that the communication terminal device performs reciprocating motion in the horizontal direction and that the cycle of the motion is equal to or longer than the predetermined period of time, analysis unit 23 judges that the sending communication terminal device is swinging in the horizontal direction. When judging that the motion of the sending communication terminal device is reciprocating motion in the vertical direction and that the cycle of the motion is equal to or longer than the predetermined period of time, analysis unit 23 judges that the sending communication terminal device is swinging in the vertical direction. Analysis unit 23 analyzes pressure data and obtains the amount of pressure applied to the sending communication terminal device.

As for image manipulation data, analysis unit 23 detects which predetermined action is being performed on the images on the display of the sending communication terminal device. More specifically, analysis unit 23 detects one code out of codes "00" to "11" that correspond to the predetermined actions to be performed on the images and are output from image manipulation data output unit 15.

Operation unit 25 performs predetermined operations, and includes data editing unit 25a, drive unit 25b, image editing unit 25c, illumination unit 25d, and sound effects unit 25e.

Data editing unit 25a divides the information data transferred from output data storage unit 22, the symbol image data of the sending communication terminal device user, the symbol image data of the user of the receiving communication terminal device itself transferred from information data input unit 11 in transmission system 1 of the receiving communication terminal device into groups according to the type of data, transfers the image data of the sending communication terminal device user and the receiving communication terminal device user to image editing unit 25c, and edits information data according to the data type. For instance, when information data is audio data, vibrato may be added to the voice, or the tone of the voice may be raised or lowered. Still picture data and animation data is modified, and the font of text data is converted. The data edited by data editing unit 25a is transferred to information data output unit 26, and is shown on the display.

Drive unit 25b realizes mechanical operations to be performed on the communication terminal device as a whole or in part. In this specification vibration of the communication terminal device performed by motor 102c is realized. Other actions realized by drive unit 25b may include bending of part of portable communication terminal device A, rotation of an antenna, and ejecting and retracting of a board or a stick that is free to move in and out of portable communication terminal device A and has characters or signs bearing a meaning written on it.

Illumination unit 25d is composed of LEDs and performs operations such as changing color between red and green or having the LEDs flash. Sound effects unit 25e emits audio data, such as a siren or animal sounds, which is stored in ROM 105 in advance and reproduced by CPU 100a, through speaker 102b. In this specification sound effects unit 25e may emit a shriek, a laugh, and a handclap as audio data.

Image editing unit 25c makes and stores various types of images, such as an video in which the symbol image of the sending communication terminal device user shakes and nods his/her head, from the symbol image data of the users of the sending or the receiving communication terminal device. Image editing unit 25c also stores other kinds of video aside from the symbol images, with these being displayed when the mode of the communication terminal device is switched to "consecutive operation mode". Image editing unit 25c may edit images otherwise, and so, may change the color or the background of the images.

When the mode of the communication terminal device is switched to "consecutive operation mode", operation unit 25 performs operations using images, sounds, and a light display in accordance with an order that is fixed in advance. More specifically, when the mode is switched to "consecutive operation mode", the components in operation unit 25 are operated so that the following series of operations is repeated. The red LEDs in illumination unit 25d flash once, a handclap is emitted from sound effects unit 25e, the green LEDs in illumination unit 25d flash once, and two handclaps are emitted from sound effects unit 25e, with an video in which an image dances to the rhythm of the flashes and the handclaps being shown on the display (refer to FIG. 18). The order of the series of operations is changed by operation control unit 24 that will be described later. The mode is switched to "consecutive operation mode" by the sending communication terminal device user.

Operation control unit 24 refers to the result of the analysis performed by analysis unit 23, has operation unit 24 perform the operations corresponding to the analyzed physical quantities, and sets operation unit 25 according to the mode corresponding to the interpreted instructions. As for the physical quantities, operation control unit 24 has operation unit 25 perform the operations corresponding to the result of the analysis by analysis unit 23 as described below.

Figure 14:
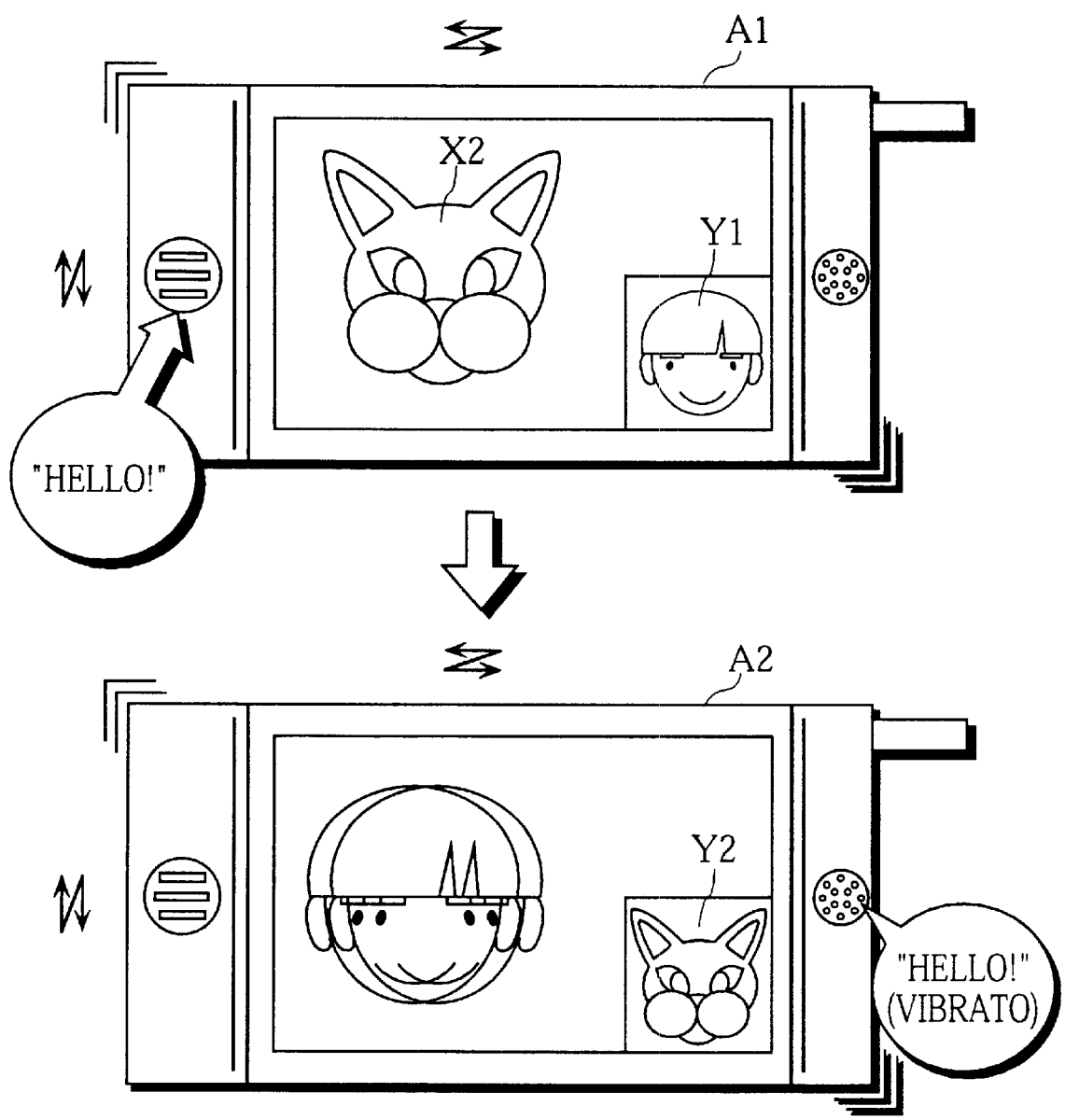
FIG. 14 shows a typical example of the corresponding actions performed by the communication terminal devices when the sending communication terminal device is vibrated.

(1) When analysis unit 23 judges that the sending communication terminal device is vibrating, operation control unit 24 has data editing unit 25a add vibrato to the audio data, drives drive unit 25b, and has image editing unit 25c output the symbol image of the sending communication terminal device user so that it is vibrating on the display (refer to FIG. 14).

(2) When analysis unit 23 judges that the sending communication terminal device is swinging in the horizontal direction, operation control unit 24 has image editing unit 25c output the symbol image of the sending communication terminal device user so that it shakes its head on the display (refer to FIG. 15).

Figure 16:
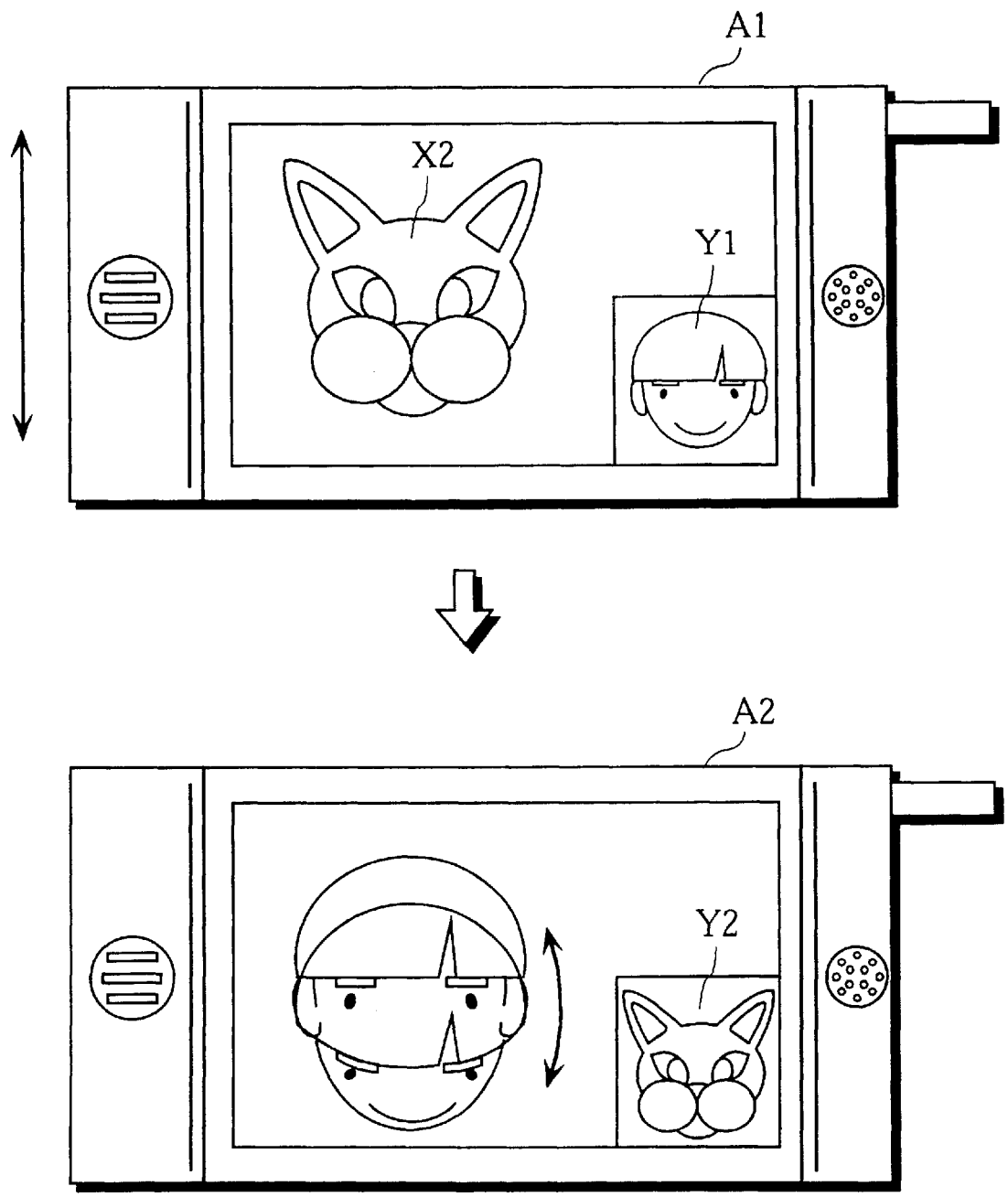
FIG. 16 shows a typical example of the corresponding actions performed by the communication terminal devices when the sending communication terminal device swings in the vertical direction.

(3) When analysis unit 23 judges that the sending communication terminal device is swinging in the vertical direction, operation control unit 24 has image editing unit 25c output the symbol image of the sending communication terminal device user so that it nods its head on the display (refer to FIG. 16).

(4) According to the amount of pressure that is applied to the sending communication terminal device, operation control unit 24 has illumination unit 25d change the color of the light that is emitted from the LEDs. More specifically, as the amount of the pressure increases, the amount of the red light emitted from the LED increases, and as the amount of the pressure decreases, the amount of green light emitted from the LED increases (refer to FIG. 17).

Figure 18:
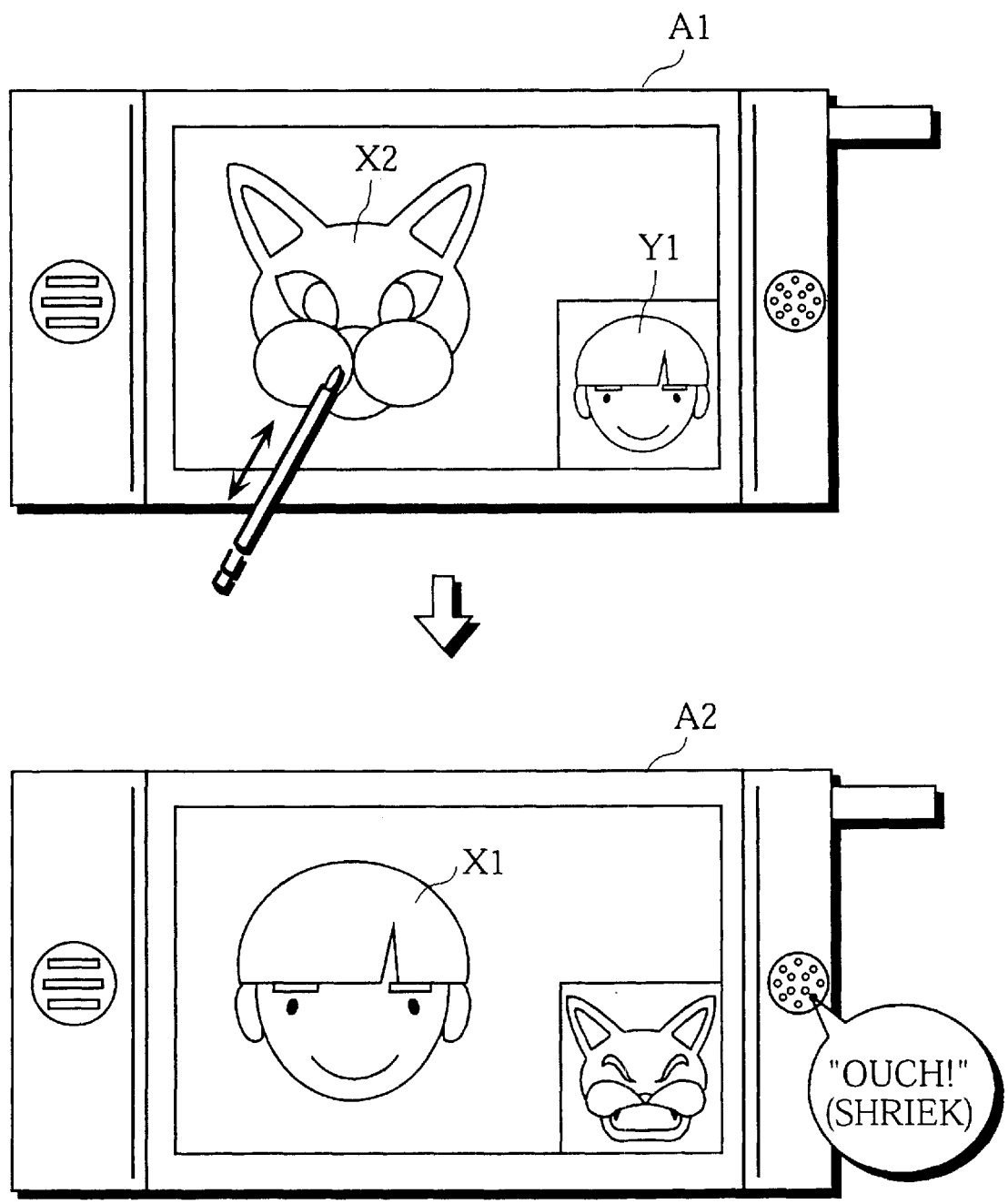
FIG. 18 shows a typical example of the corresponding actions performed by the communication terminal devices when the symbol image of the receiving communication terminal device user displayed on the sending communication terminal device is pressed.

(5) When code "00" is detected as image manipulation data, that is, when analysis unit 23 judges that the symbol image of the receiving communication terminal device user is pressed by the sending communication terminal device user with the point of pen 101a', operation control unit 24 has image editing unit 25*c* show a painful expression on the symbol image of the receiving communication terminal device and has sound effects unit 25*e* emit a shriek (refer to FIG. 18).

Figure 19:
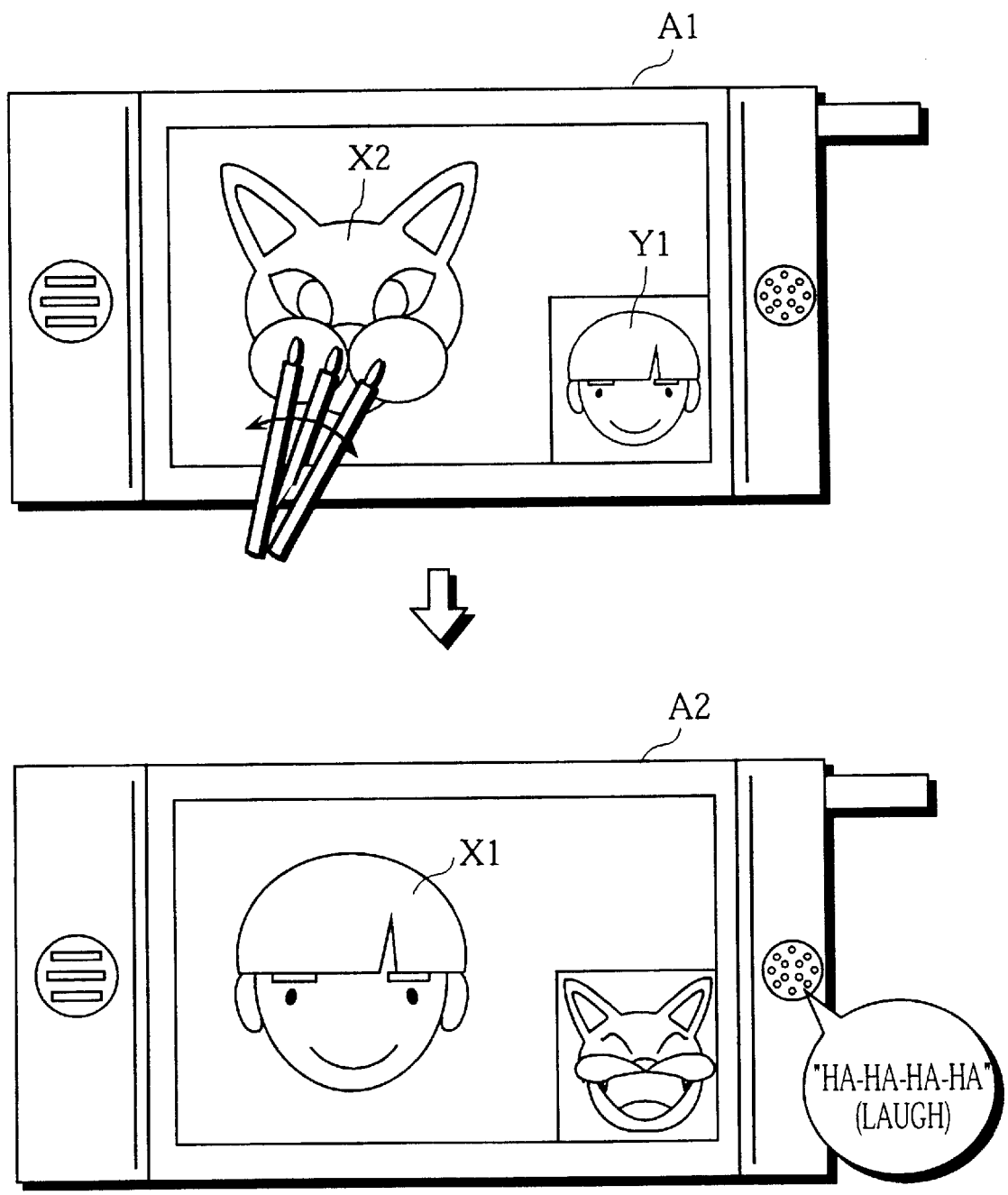
FIG. 19 shows a typical example of the corresponding actions performed by the communication terminal devices when the symbol image of the receiving communication terminal device user displayed on the sending communication terminal device is stroked.

(6) When code "01" is detected as image manipulation data, that is, when analysis unit 23 judges that the symbol image of the receiving communication terminal device user is stroked by the sending communication terminal device user with the point of pen 101*a*', operation control unit 24 has image editing unit 25*c* show an amused expression on the symbol image of the receiving communication terminal device and has sound effects unit 25*e* emit a laugh (refer to FIG. 19).

Figure 20:
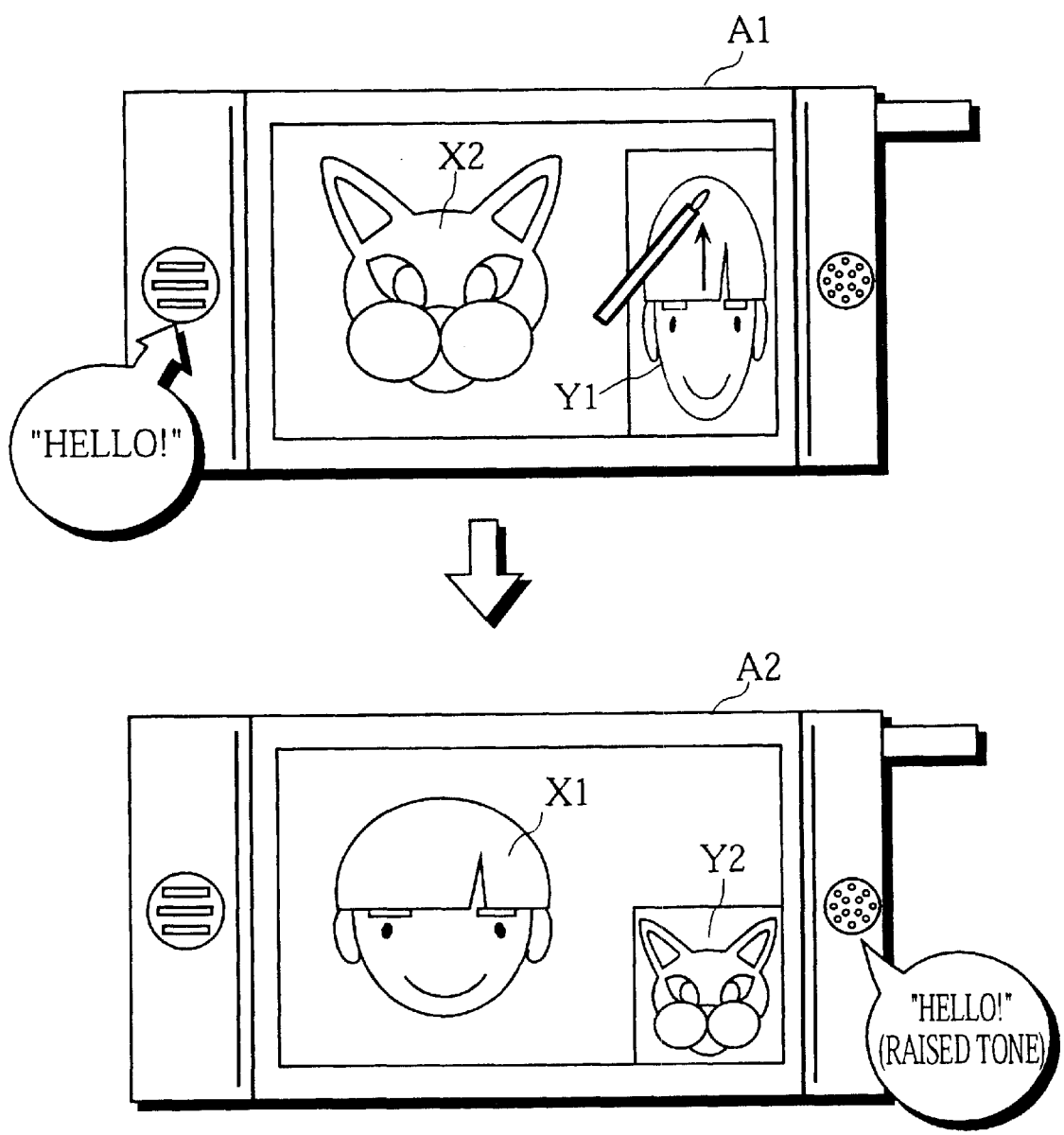
FIG. 20 shows a typical example of the corresponding actions performed by the communication terminal devices when the height of the symbol image of the sending communication terminal device user displayed on the sending communication terminal device is increased.

(7) When code "10" is detected as image manipulation data, that is, when analysis unit 23 judges that the sending communication terminal device user presses the head of the image thereof with the point of pen 101*a*' and moves the point of the pen up, operation control unit 24 raises the tone of the voice transmitted to data editing unit 25*a* (refer to FIG. 20).

(8) When code "11" is detected as image manipulation data, that is, when analysis unit 23 judges that the sending communication terminal device user presses the head of the image thereof with the point of pen 101*a*' and moves the point of the pen down, operation control unit 24 raises the tone of the voice transmitted to data editing unit 25*a* (refer to FIG. 21).

(9) When the mode is "consecutive operation mode" and when analysis unit 23 judges that the sending communication terminal device is vibrating or code "01" is detected as image manipulation data, operation control unit 24 changes the predetermined operations to be performed by operation unit 25 in the "consecutive operation mode". More specifically, operation control unit 24 has the LEDs in illumination unit 25*d* emit red light and green light alternately, has sound effects unit 25*e* emit handclaps successively, and has the image in the video on display 102*a* dance more vigorously (refer to FIG. 22B).

When no physical quantity data is detected by output data judgement storage unit 22 for a certain period of time and a reset signal that is described above is detected by output data judgement storage unit 22, operation control unit 24 has operation unit 25 stop performing the operations corresponding to the physical quantity data and the image manipulation data.

Some examples of the operations that operation control unit 24 has operation unit 25 perform have been described above. The following are other examples of such actions.

(I) When analysis unit 23 judges that the sending communication terminal device is swinging in the vertical direction, operation control unit 24 has operation unit 25 eject the board on which "O" is written.

(II) When physical quantity detection unit 12 in the sending communication terminal device detects the temperature of the environment, operation control unit 24 has operation unit 25 change the background of the image shown on display 102*a* according to the temperature.

(III) When physical quantity detection unit 12 in the sending communication terminal device detects the atmospheric pressure and the humidity of the environment and when analysis unit 23 judges that it is raining, operation control unit 24 has operation unit 25 change the background of the image shown on display 102*a* to a picture in which it is raining.

(IV) When physical quantity detection unit 12 in the sending communication terminal device detects the illuminance of the environment, operation control unit 24 has operation unit 25 change the brightness of the background of the image shown on display 102*a* according to the illuminance.

(V) When the phrase "I'm sorry" is input on window 20*a* in image manipulation unit 14 in the sending communication terminal device, operation control unit 24 has operation unit 25 display the symbol image of the sending communication terminal device user that apologizes on display 102*a*.

The operations described in (II) to (IV) may transmit not the emotions of the sending communication terminal device user but the environmental conditions of the sending communication terminal device user. In this sense the above-described actions may realize a greater variety of communication.

Information data output unit 26 outputs the information data edited by data editing unit 25*a* on display 102*a* and outputs the image data edited by image editing unit 25*c* through loudspeaker 102*b*. When data editing unit 25*a* performs no operation on information data, the information data is output as it is.

Transmission system 1 and reception system 2 whose constructions have been described may be realized by installing the software that realizes the above-described constructions in a standard computer terminal device that includes acceleration sensor 101*c*, pressure sensors 101*d* which each are included in physical quantity detection unit 12, motor 102*c* included in drive unit 25*b*, and LEDs 102*d* included in illumination unit 25*d*. Such software may be recorded on record medium that is read by the above-described computer terminal device. Acceleration sensor 101*c*, pressure sensors 101*d*, drive unit 25*b*, and illumination unit 25*d* may be included in a unit that is constructed so as to be connected to a standard computer. When such a unit is connected to a standard computer, the above-described software may realize the transmission system 1 and reception system 2.

In the present embodiment the above-described constructions are realized by recording the software on IC card 104*b* and reading the software recorded on IC card 104*b* with IC card reader 104*a*. The software may be recorded on ROM 105 in advance.

The following is the explanation of the operations performed by transmission system 1 and reception system 2 whose constructions have been described above. Communication is performed between portable communication terminal devices A1 and A2 shown in FIGS. 4A and 4B respectively which each include transmission system 1 and reception system 2 whose constructions have been described above. Hereinafter portable communication terminal device A1 will be referred to as the first communication terminal device, and portable communication terminal device A2 will be referred to as the second communication terminal device.

Figure 4A:
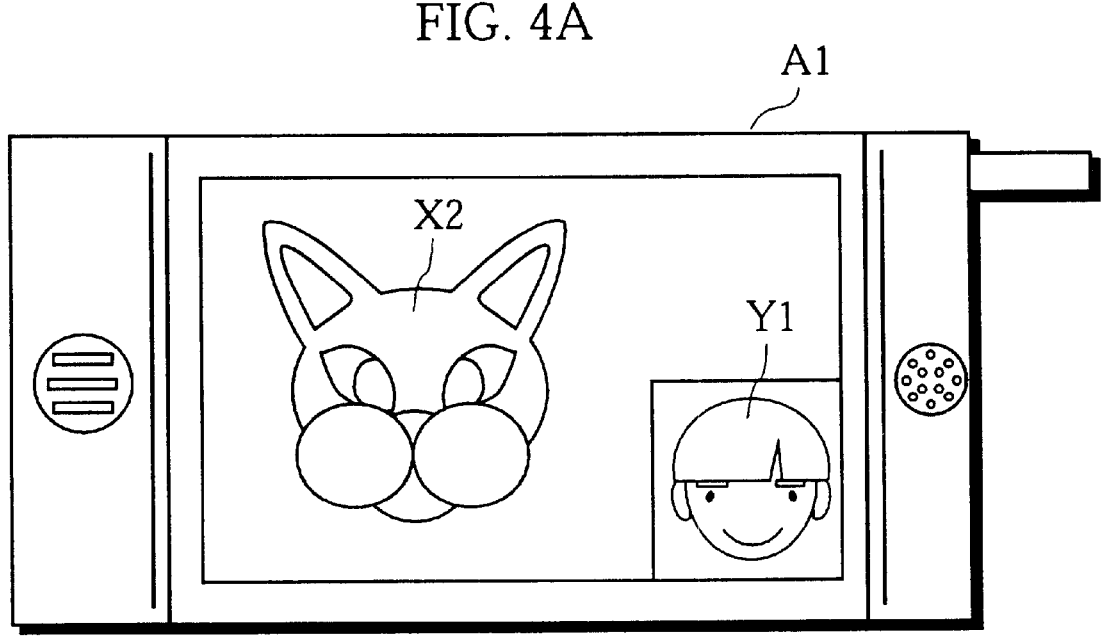
FIG. 4A is an example of the images shown on the display of the sending portable communication terminal device.
Figure 4B:
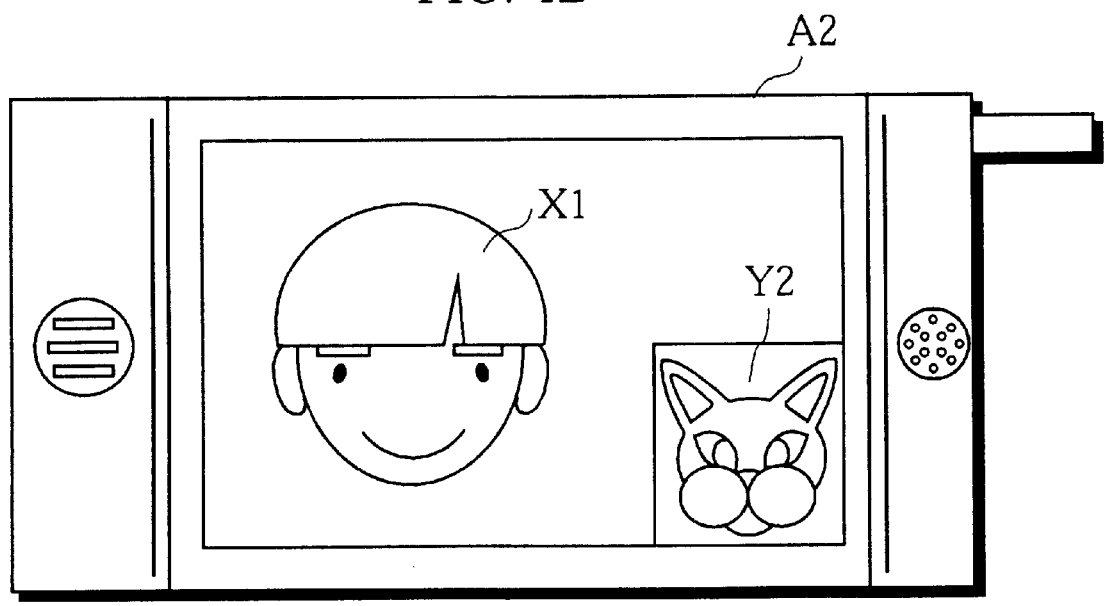
FIG. 4B is an example of the images shown on the display of the receiving portable communication terminal device.
Figure 8:
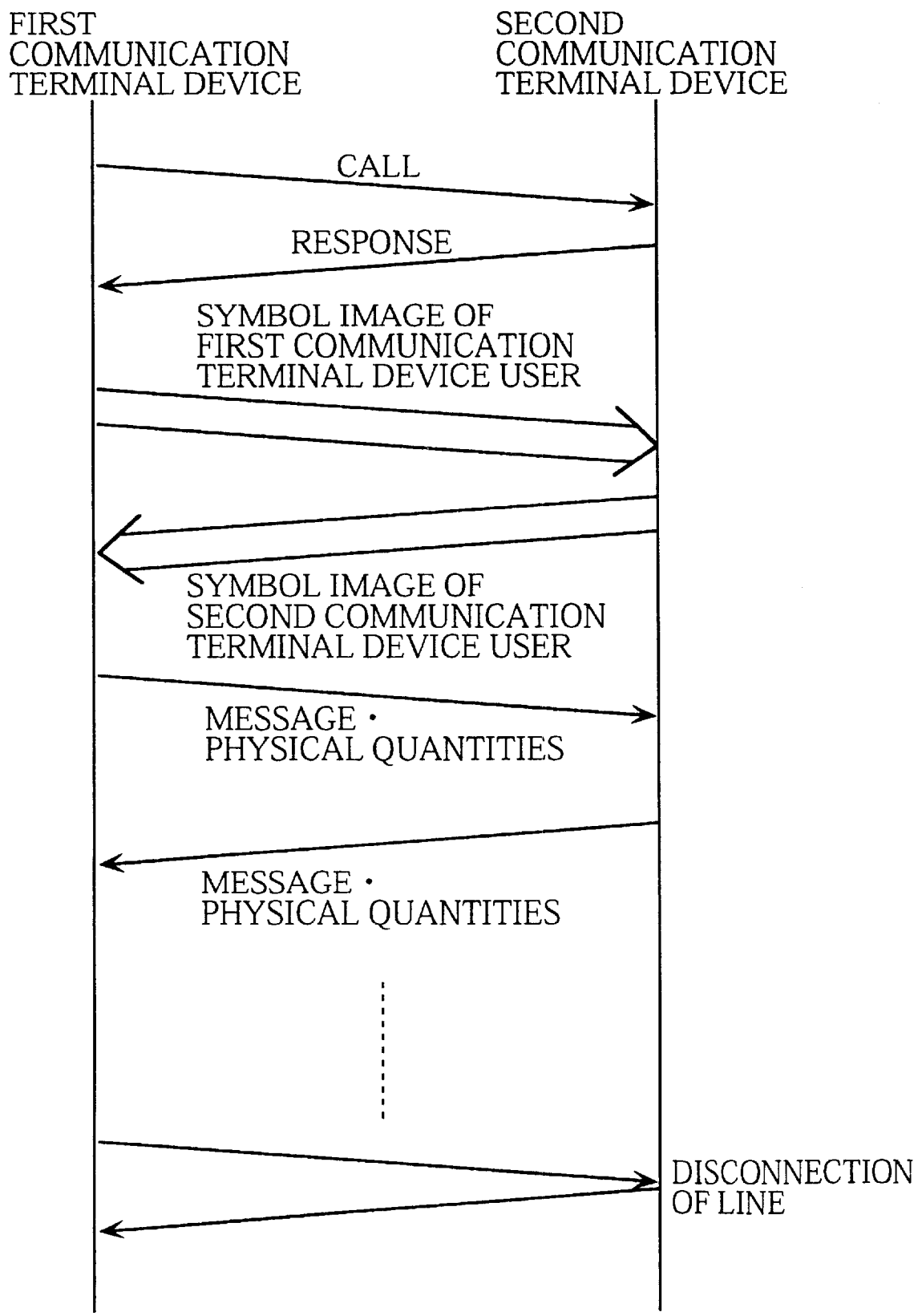
FIG. 8 is a sequence diagram showing the procedure in which communication is performed between the communication terminal devices.

When the first communication terminal device issues a call to the second communication terminal device, the communication between the two communication terminal devices is performed in the manner shown in FIG. 8. More specifically, the first communication terminal device issues the call to the second communication terminal device, and the second communication terminal device acknowledges the receipt of the call by returning a response to the first communication terminal device before the line is connected. Then each of these communication terminal devices transmits the symbol image that represents the user thereof to the other communication terminal device, and transmits and receives audio data messages using microphones and loudspeakers, or other kinds of data such as physical quantity data. When the transmission of symbol images is completed, symbol image X2 that represents the second communication terminal device user and symbol image Y1 that represents the first communication terminal device user are displayed on the first communication terminal device as shown in FIG. 4A. On the other hand, symbol image X1 that represents the first communication terminal device user and symbol image Y2 that represents the second communication terminal device user are displayed on the second communication terminal device as shown in FIG. 4B. While the symbol images are displayed on these communication terminal devices as shown in FIGS. 4A and 4B, physical quantity data and information data are transmitted and received. Information data is received by information data input unit 11 and transferred to input data storage unit 16. When the communication terminal device is vibrated, swung in the vertical or horizontal directions, or gripped tightly by its user, physical quantity data is detected by physical detection unit 12. Each kind of physical quantity data is digitized and output by physical quantity data output unit 13. When the first communication terminal device user presses or strokes image X2 that represents the receiver of the data from the first communication terminal device with pen 101 a', or when the first communication terminal device user moves the point of pen 101a' up and down while pressing the head of image Y1 that represents the first communication terminal device user himself/herself with pen 101 a', image manipulation data that includes one code out of codes "00" to "11" is output. The output image manipulation data is stored in input data storage unit 16.

Each piece of data stored in input data storage unit 16 is controlled by transmission control unit 17 and transmitted from transmission unit 19. The process performed by transmission control unit 17 is shown in the flowcharts in FIGS. 9 and 10. The following is the explanation of the process performed by transmission control unit 17 with reference to FIGS. 9 and 10.

Transmission control unit 17 judges whether data is stored in input data storage unit 16 (Step S101). When no data is stored in input data storage unit 16, transmission control unit 17 waits for data to be stored in input data storage unit 16 (Step S124). When data is stored in input data storage unit 16, transmission control unit 17 judges the contents of the data.

When only information data is included in the data, transmission control unit 17 preferentially transmits any audio data that is present (Steps S103 and S104). When other kinds of data apart from audio data is included in the information data and the transmission of the data is indicated by transmission data instruction unit 18, transmission control unit 17 transmits the data (Steps S105 and S106). The data that has been transmitted is then cleared from input data storage unit 16. This is also the case in the process described below.

When only physical quantity data or image manipulation data is stored in input data storage unit 16, unless transmission data instruction unit 18 indicates that the data transmission should be stopped, the data is transmitted (Steps S108 to S110).

When information data, physical quantity data, and image manipulation data are stored in input data storage unit 16, transmission control unit 17 controls the transmission as described below. When the information data includes other kinds of data apart from audio data, and when transmission data instruction unit 18 indicates transmission, transmission control unit 17 preferentially transmits the information data (Steps S111 to S113).

When the information data includes audio data, transmission control unit 17 judges whether moving speed data is included in the physical quantity data (Steps S114 and S115), and further judges whether code "10" or "11" is included in the image data, that is, whether there is image manipulation data that affects the audio data (Steps S116 and S119).

When judging that moving speed data is not included in the physical quantity data and that code "10" or "11" is included in the image manipulation data, transmission control unit 17 transmits the image manipulation data that includes code "10" or "11" first and then transmits the audio data (Step S117). When no moving speed data is included in the physical quantity data and neither of codes "10" and "11" is included in the image manipulation data, transmission control unit 17 transmits the audio data as normal (Step S118).

When moving speed data is included in the physical quantity data and neither of codes "10" and "11" is included in the image manipulation data, transmission control unit 17 divides the physical quantity data into a plurality of parts to be inserted between the pieces of audio data, and transmits the physical quantity data and the audio data (Step S120). When moving speed data is included in the physical quantity data and code "10" or "11" is included in the image manipulation data, transmission control unit 17 transmits the image manipulation data that includes code "10" or "11" first, then divides the physical quantity data into a plurality of parts to be inserted between the pieces of audio data, and transmits the physical quantity data and the audio data (Step S121).

Figure 9:
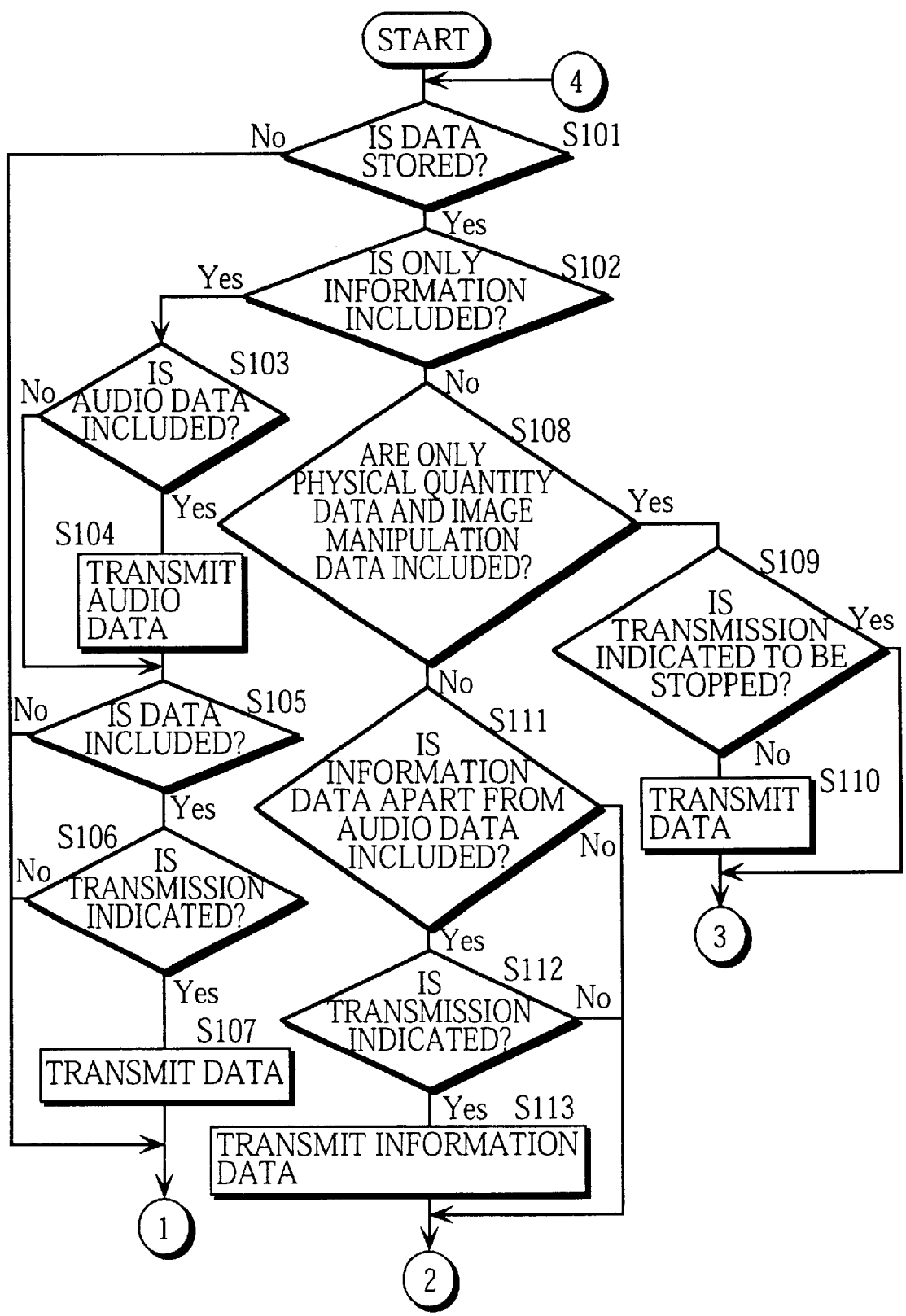
FIG. 9 is a flowchart that shows the first half of the transmission control process by the communication terminal device.
Figure 10:
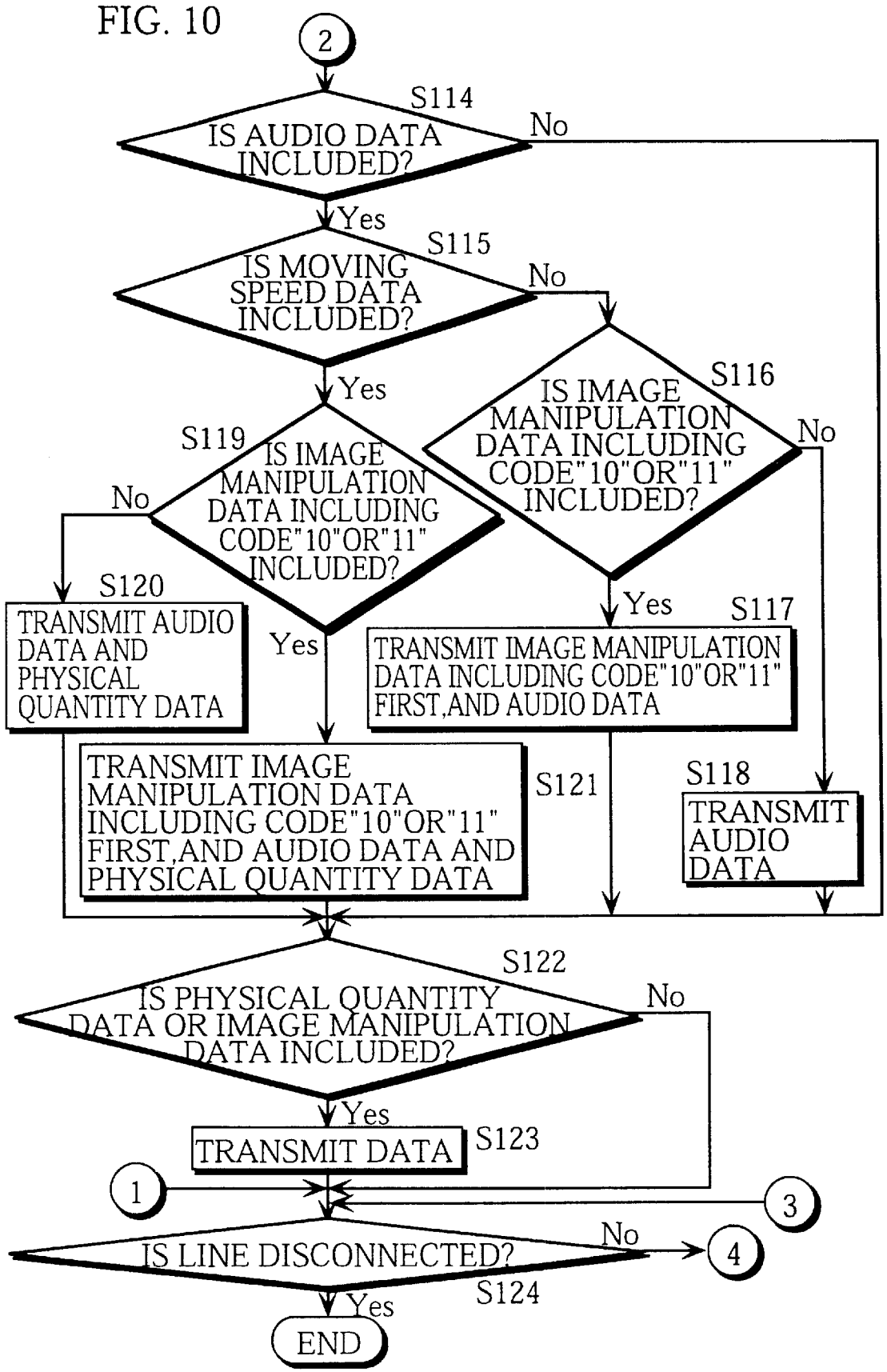
FIG. 10 is a flowchart that shows the second half of the transmission control process by the communication terminal device.

When physical quantity data or image manipulation data to be transmitted is further stored in input data storage unit 16, transmission control unit 17 transmits the physical quantity data or image manipulation data (Steps S122 and S123). Transmission control unit 17 repeats the above-described process until the line between these communication terminal devices is disconnected (Step S124). The above-described process that is performed by transmission control unit 17 and shown in FIGS. 9 and 10 is, however, merely one example. A variety of processes may be performed by transmission control unit 17 according to the circumstances.

The following is the explanation of reception system 2 included in the second communication terminal device, or portable communication terminal device A2. First of all reception unit 21 receives data transmitted from the first communication terminal device, or portable communication terminal device A1, and output data judgement storage unit 22 judges the kind of data and stores the data. Then the information data included in the data that is stored in output data judgement storage unit 22 is output from information data output unit 26 through data editing unit 25a as it is.

Figure 11:
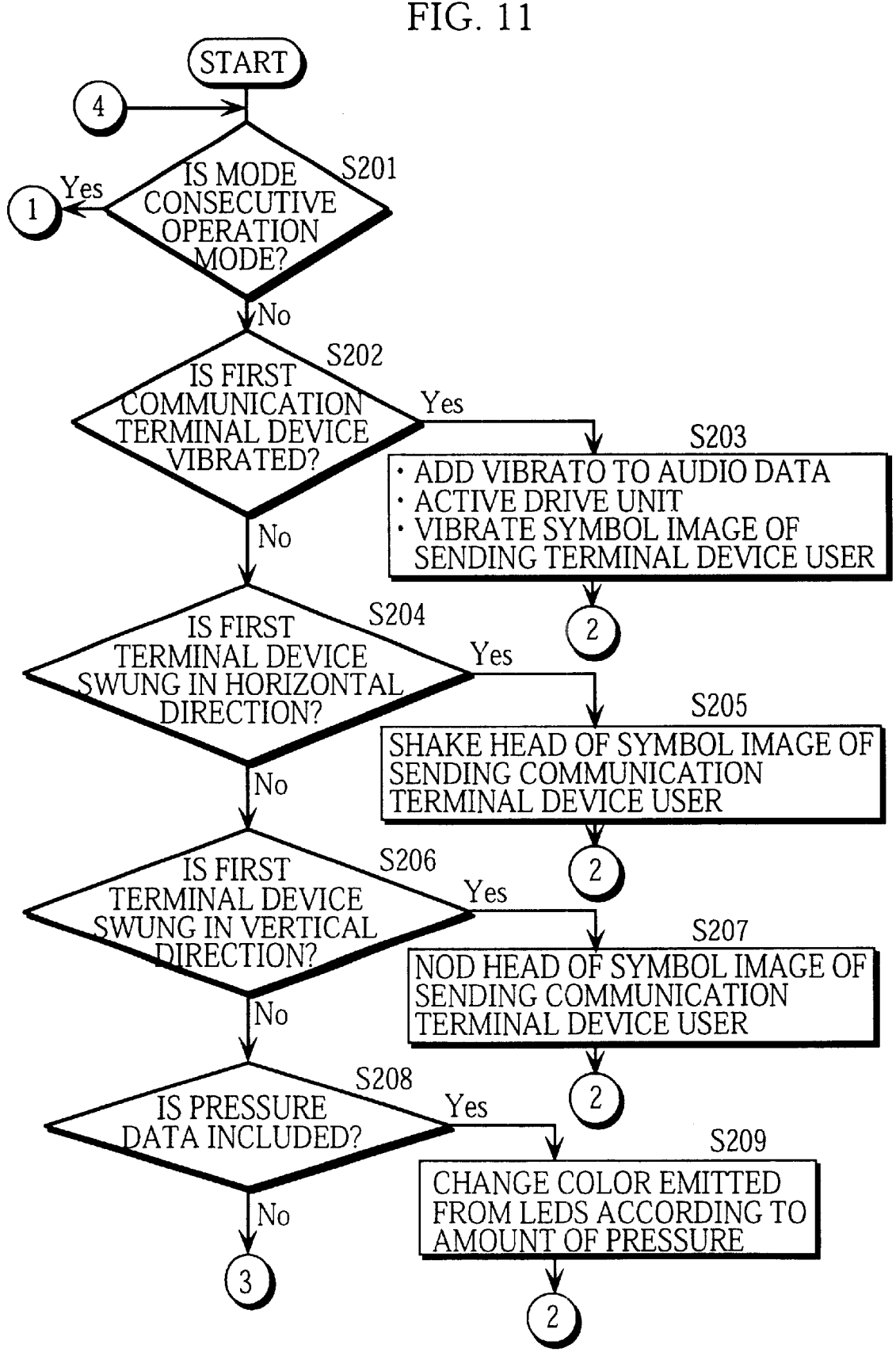
FIGS. 11 to 13 are flowcharts that show the action control process by the communication terminal device.
Figure 12:
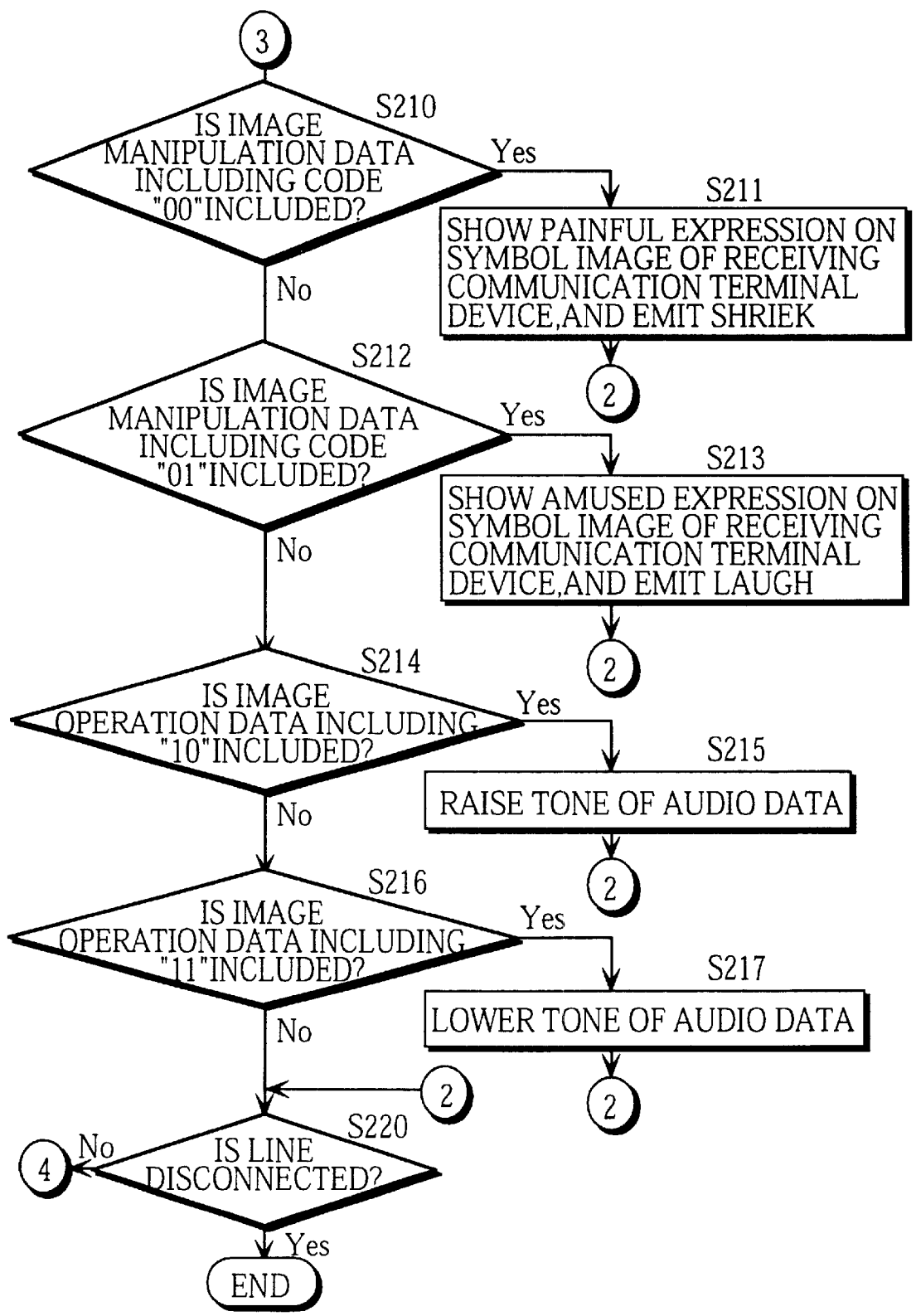
Figure 13:
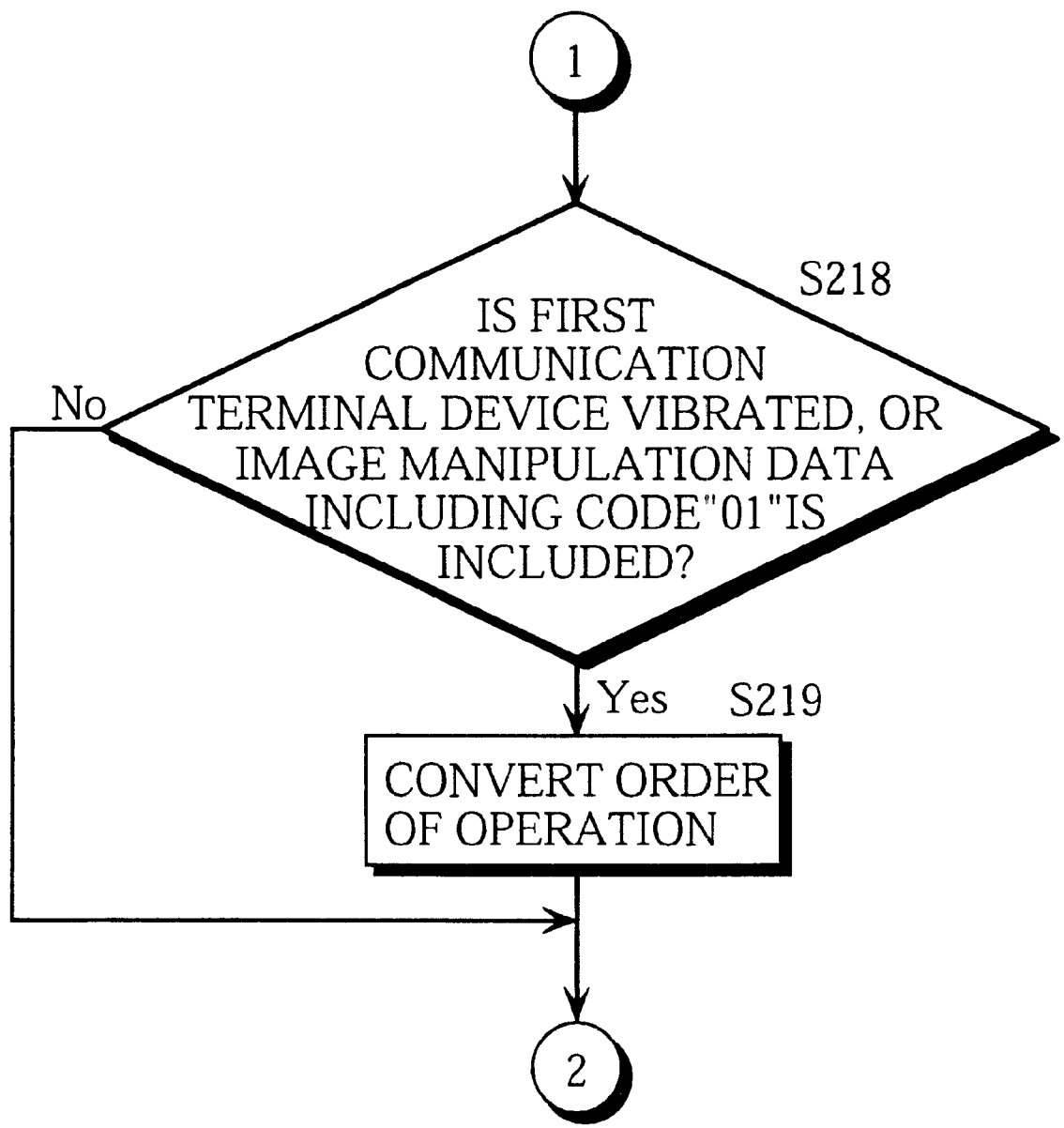

On the other hand, the physical quantity data and the image manipulation data stored in output data judgement storage unit 22 is analyzed by analysis unit 23, and operation control unit 24 controls the operations performed by operation unit 25 according to the result of the analysis. The operations performed by operation control unit 24 are shown in the flowcharts in FIGS. 11, 12, and 13. The following is a detailed explanation of the process performed by operation control unit 24 with reference to the flowcharts in FIGS. 11, 12, and 13. In these operations the physical quantity data and the image manipulation data that has been analyzed by analysis unit 23, and the information data that has been output from information data output unit 26 is cleared from output data judgement storage unit 22.

Operation control unit 24 judges whether the mode of operation unit 25 is set as "consecutive operation mode" (Step S201), and performs different operations when the mode of operation unit 25 is set as another mode. The explanation of the operations that are performed when the mode of operation unit 25 is set as the mode other than "consecutive operation mode" will be given below.

When analysis unit 23 judges that the first communication terminal device is vibrating according to the analysis result, operation control unit 24 has data editing unit 25a add vibrato to audio data, drives drive unit 25b, and has image editing unit 25c vibrate the symbol image that represents the first communication terminal device user (Steps S202 and S203). As a result, when the first communication terminal device is vibrated, the receiving communication terminal device user finds that the voice of the first communication terminal device user emitted from loudspeaker 102b of the second communication terminal device vibrates, the second communication terminal device itself vibrates, and symbol image X1 that represents the user of the first communication terminal device and is shown on display 102a of the second communication terminal device vibrates as shown in FIG. 14.

When analysis unit 23 judges that the first communication terminal device is swinging in the horizontal direction, operation control unit 24 has image editing unit 25c shake the head of the symbol image that represents the first communication terminal device user (Steps S204 and S205). As a result, when the first communication terminal device user swings the first communication terminal device in the horizontal direction, the receiving communication terminal device user finds that symbol image X1 shown on display 102a of the second communication terminal device shakes its head as shown in FIG. 15.

When analysis unit 23 judges that the first communication terminal device is swinging in the vertical direction, operation control unit 24 has image editing unit 25c nod the head of the symbol image that represents the first communication terminal device user (Steps S206 and S207). As a result, when the first communication terminal device user swings the first communication terminal device in the vertical direction, the receiving communication terminal device user finds that symbol image X1 on display 102a of the second communication terminal device nods its head as shown in FIG. 16.

When pressure data is stored in output data judgement storage unit 22, operation control unit 24 controls the amount of red light and green light emitted from the LEDs in illumination unit 25d according to the amount of the pressure data. More specifically, operation control unit 24 has the red LEDs in illumination unit 25d increase the emission amount as the amount of pressure data increases and has the green LEDs increase the emission amount as the amount of pressure date decreases (Steps S208 and S209). As a result, the color of light that is emitted from LEDs 102d of the second communication terminal device changes between red and green according to the amount of pressure applied to by the first communication terminal device when the user grips the first communication terminal device as shown in FIG. 17.

When code "00" is detected as image manipulation data, that is, when analysis unit 23 judges that symbol image X2 that represents the second communication terminal device user is pressed with the point of pen 101a' on the display of the first communication terminal device, operation control unit 24 has image editing unit 25c show a painful expression on symbol image Y2 that represents the second communication terminal device user, and has sound effects unit 25c emit a shriek (Steps S210 and S211). As a result, the action performed by the first communication terminal device user is conveyed to the second communication terminal device user in images and sound as shown in FIG. 18.

When code "01" is detected as image manipulation data, that is, when analysis unit 23 judges that symbol image X2 that represents the second communication terminal device user is stroked with the point of pen 101a' on the display on the first communication terminal device, operation control unit 24 has image editing unit 25c show an amused expression on symbol image Y2 that represents the second communication terminal device user, and has sound effects unit 25e emit a laugh (Steps S212 and S213). As a result, the image and the sound corresponding to the result of the action performed on the first communication terminal device are expressed by the second communication terminal device as shown in FIG. 19.

When code "10" is detected as image manipulation data, that is, when analysis unit 23 judges that the first communication terminal device user presses the head of image Y1 that represents the first communication terminal device user with the point of pen 101 a' and moves the point of the pen up, operation control unit 24 raises the tone of the voice transmitted to data editing unit 25a (Steps S214 and S215). As a result, the tone of the voice that is input in the first communication terminal device along with the above-described action is raised when the voice is output from the second communication terminal device as shown in FIG. 20.

When code "11" is detected as image manipulation data, that is, when analysis unit 23 judges that the first communication terminal device user presses the head of image Y1 that represents the first communication terminal device user with the point of pen 101 a' and moves the point of the pen down, operation control unit 24 lowers the tone of the voice transmitted to data editing unit 25a (Steps S216 and S217). As a result, the tone of the voice that is input in the first communication terminal device is lowered when the voice is output from the second communication terminal device as shown in FIG. 21.

The explanation of the operations that are performed when the mode of operation unit 25 is set as "consecutive operation mode" will be given below. When analysis unit 23 analyzes that the first communication terminal device is vibrating, or when code "01" is detected as image manipulation data, operation control unit 24 changes the predetermined operations to be performed by operation unit 25 is the "consecutive operation mode" (Steps S218 and S219).

Figure 22A:
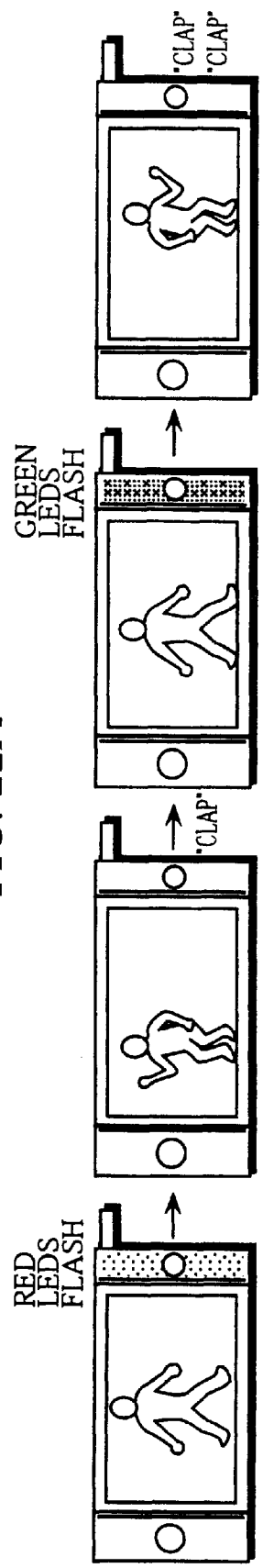
FIG. 22A shows the actions by the receiving communication terminal device when the operation unit operates in the predetermined order in the "consecutive operation mode".
Figure 22B:
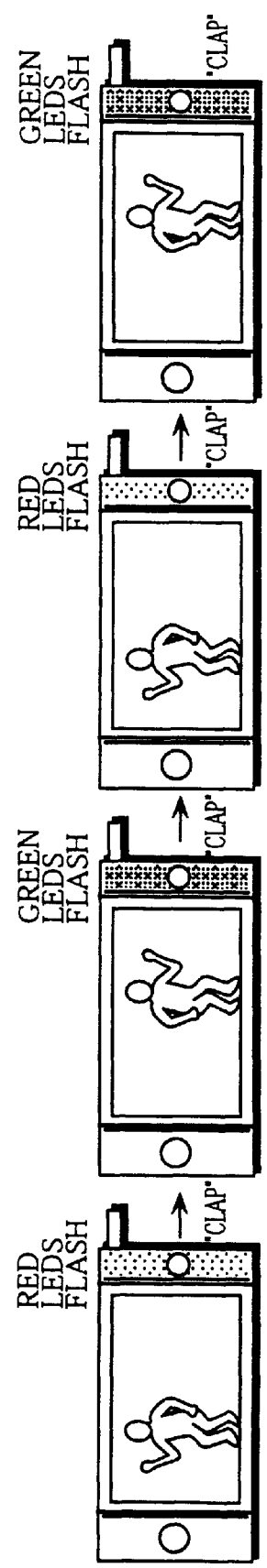
FIG. 22B shows the actions by the receiving communication terminal device when the operation unit operates in another predetermined order in the "consecutive operation mode".

More specifically, the first communication terminal device user sets the mode of operation unit 25 in the second communication terminal device as "consecutive operation mode", has operation unit 25 repeat the operations in which the rod LEDs flash once, one handclap is omitted, the green LEDs flash once, and two handclaps are emitted, and has the operation unit 25 display an video in which an image dances to the rhythm of the flashes and the handclaps on display 102a in the second communication terminal device as shown in FIG. 22A. When the first communication terminal device is vibrated, or when symbol image X2 that represents the second communication terminal device user shown on display 102a in the first communication terminal device is stroked with pen 101a', the operations repeated by operation unit 25 in the second communication terminal device changes as shown in FIG. 22B. More specifically, the red LEDs and the green LEDs are illuminated alternately, the handclaps are successively emitted, and the image in the video on display 102a dances more actively to the rhythm of the flashes and the handclaps.

Operation control unit 24 repeats the above-described process until the line between these communication terminal devices is disconnected (Step S220). In the above-described communication between those two communication terminal devices, not only information data but also the emotions of the first communication terminal device user may be conveyed to the second communication terminal device user.

While the first communication terminal device transmits the moving speed data in vibration, reciprocating motion in the horizontal direction, and reciprocating motion in the vertical direction to the second communication terminal device without classifying the kinds of movement, and the second communication terminal device analyzes the moving speed data and has operation control unit 24 control operations according to the kind of the motion in the present embodiment, it is possible for a sending communication terminal device to classify the moving speed data according to the kind of motion.

For instance, a code may be given to each kind of motion performed by the first communication terminal device according to the moving speed data calculated by physical quantity data output unit 13. When the moving speed data calculated by physical quantity data output unit 13 indicates that the first communication terminal device performs reciprocating motion and the cycle of the motion is shorter than the predetermined period of time, the motion of the first communication terminal device is judged as vibration and code "00" is given to the motion. When the moving speed data indicates that the first communication terminal device performs reciprocating motion in the horizontal direction and the cycle of the motion is equal to or longer than the predetermined period of time, the motion of the first communication terminal device is judged as swinging in the horizontal direction and code "01" is given to the motion. When the moving speed data indicates that the first communication terminal device performs reciprocating motion in the vertical direction and the cycle of the motion is equal to or longer than the predetermined period of time, the motion of the first communication terminal device is judged as swinging in the vertical direction and code "10" is given to the motion. Then header that indicates that the data is physical quantity data is added to the moving speed data, and the moving speed data is output as physical quantity data in the same way as image manipulation data. Transmission control unit 17 may exert transmission control on the moving speed data according to the code.

While operation control unit 24 prepares the operations to be performed by operation unit 25 on physical quantity data and image manipulation data in advance in the present embodiment, the instructions as to the operations to be performed on physical quantity data and image manipulation data and the program that realizes these actions may be transmitted along with the physical quantity data and the image manipulation data from the first communication terminal device to be used by operation control unit 24.

Figure 23A:
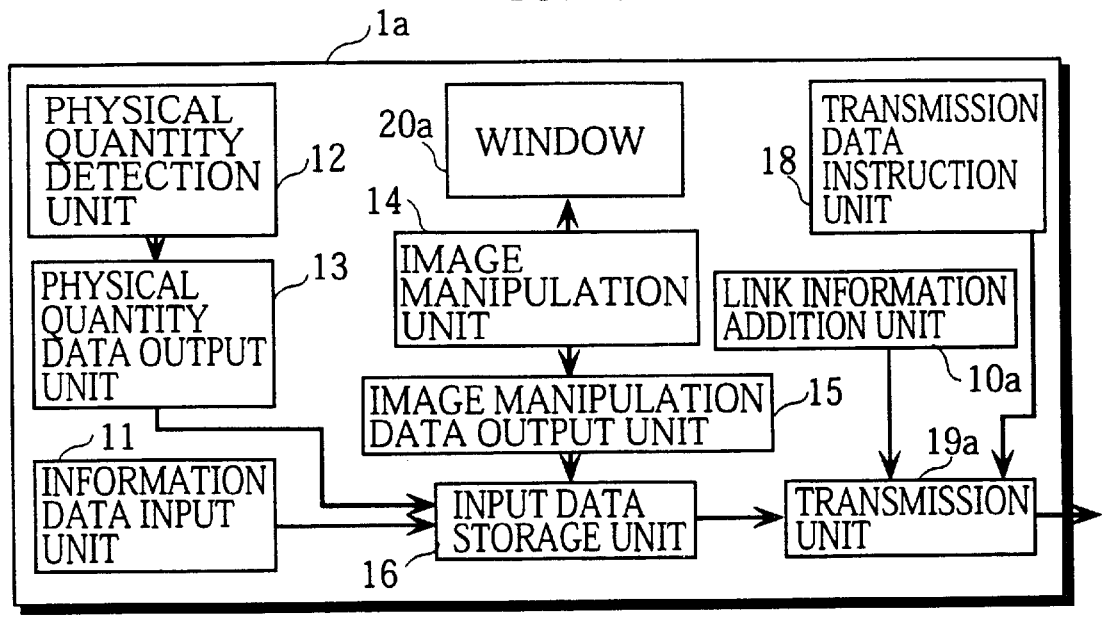
FIG. 23A is a functional block diagram of the sending communication terminal device according to the second embodiment of the present invention.
Figure 23B:
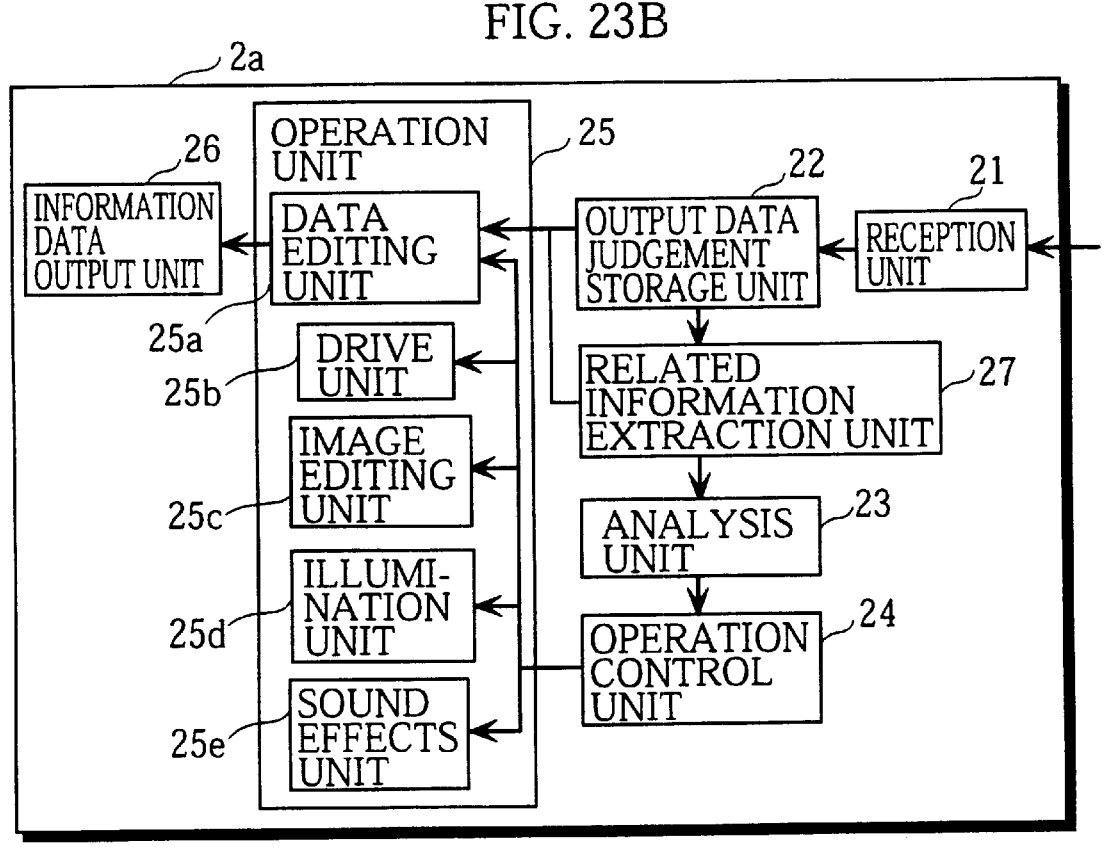
FIG. 23B is a functional block diagram of the receiving communication terminal device according to the second embodiment of the present invention.

FIG. 23 is a functional block diagram of transmission system 1a and reception system 2a in a communication terminal device according to another embodiment of the present invention. Transmission system 1a differs from transmission system 1 according to the above-described embodiment in including link information addition unit 10a instead of transmission control unit 17 and including transmission unit 19a whose functions differ from those of transmission unit 19. Reception system 2a differs from reception system 2 according to the above-described embodiment in including related information extraction unit 27.

Link information addition unit 10a in transmission system 1a adds link information, which relates certain information data with certain physical quantity data or certain image manipulation data, to the certain information data and the certain physical quantity data or certain image manipulation data. More specifically, moving speed data is used as the certain physical quantity data, image manipulation data to which code "10" or "11" is added is used as the certain image manipulation data, and audio data that is input while the certain physical quantity data and the certain image manipulation data are input is used as the certain information data. Each of the certain physical quantity data, the certain image manipulation data, and the certain information data is treated as one piece of information. The same code is added as the link information to the header of the certain physical quantity data and that of the certain information data, or to the header of the certain image manipulation data and that of the certain information data. The period of time in which certain image manipulation data is input is the period of time from the start of an action to the issuing of the reset signal.

Transmission unit 19a transmits information data preferentially when transmitting the data that is stored in input data storing unit 16, giving top priority to the instructions from transmission data instruction unit 18.

Related information extraction unit 27 in reception system 2a extracts the certain information data, and the certain physical quantity data or the certain image manipulation data according to the link information. More specifically, the related audio data, and moving speed data or image manipulation data to which code "10" or "11" is added are extracted.

Figure 24:
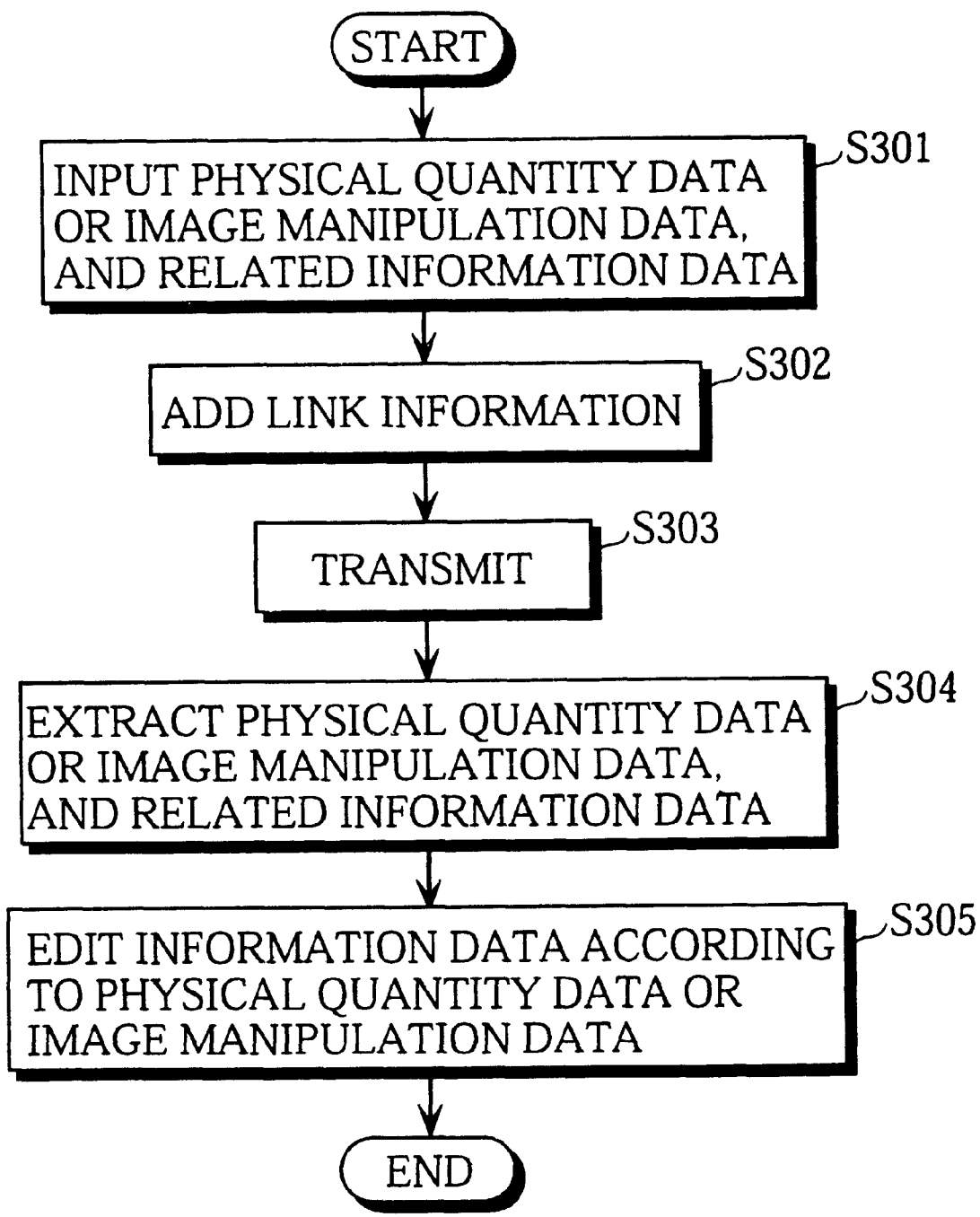
FIG. 24 shows the process performed by the sending and the receiving communication terminal devices of FIGS. 23A and 23B.

The operations related to the components that are included only in above-described transmission system 1a or reception system 2a, or whose functions differ from those of their counterparts in transmission system 1 and reception system 2 will be explained below. FIG. 24 is the flowchart that shows the operations.

The first communication terminal device user inputs audio data when vibrating the first communication terminal device or when increasing or decreasing the height of the symbol image of the first communication terminal device user, and stores the physical quantity data or the image manipulation data, and the information data that is obtained from these actions in input data storage unit 16 (Step S301).

Link information addition unit 10a adds link information to the physical quantity data or the image manipulation data, and the information data that are related to each other (Step S302). Transmission unit 19a transmits the data stored in input data storage unit 16 in order of storage, preferentially transmitting the information data (Step S303).

Reception unit 21 in the second communication terminal device receives the transmitted data, and stores the data in output data storage unit 22. Related information extraction unit 27 extracts the physical quantity data or the image manipulation data, and the audio data to which each the same link information has been added (Step S304).

When the audio data to which the link information is added is stored in output data storage unit 22 and the physical quantity data or the image manipulation data to which the corresponding link information is added is not stored in output data storage unit 22, the audio data is not output from information data output unit 26 and will have been stored in output data storage unit 22 or in related information extraction unit 27 until the physical quantity data or the image manipulation data is stored in output data storage unit 22.

Analysis unit 23 analyzes the physical quantity data or the image manipulation data to which the link information is added, and operation control unit 24 has information data editing unit 25a edit the audio data that is extracted by related information extraction unit 27 according to the analysis result (Step S305).

As described above, using link information to relate the physical quantity data or the image manipulation data with the information data which is edited by information data editing unit 25a may enable data editing unit 25a perform its operations properly in the construction shown in FIG. 23.

The following is the explanation of another embodiment of the present invention.

Figure 25:
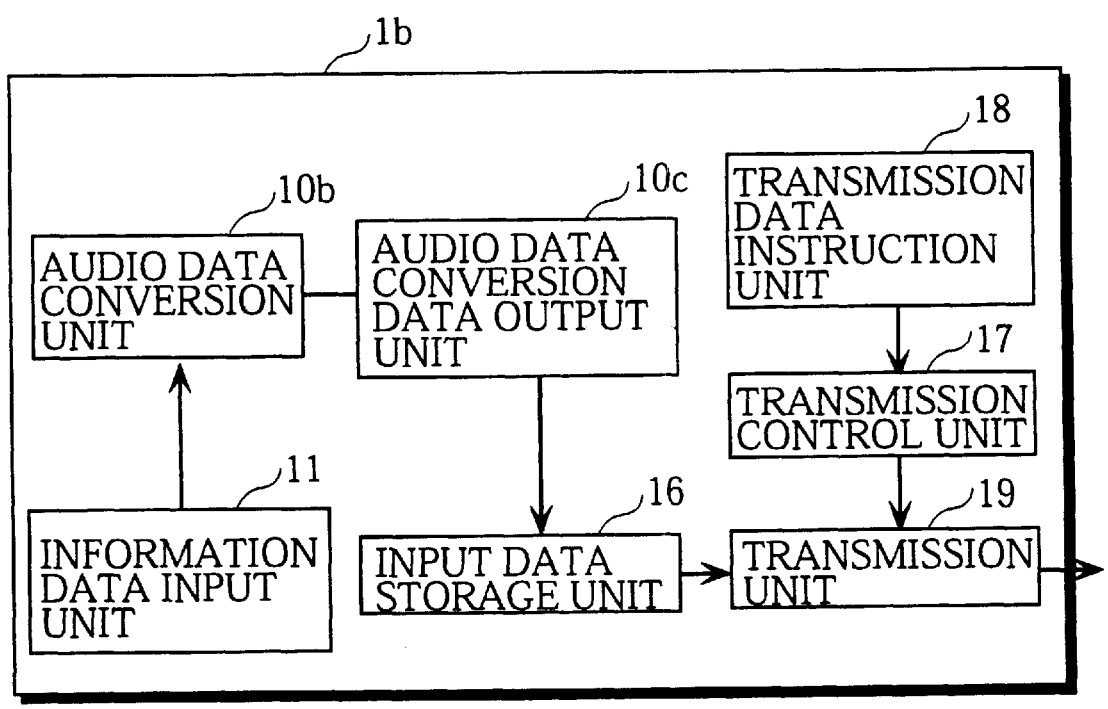
FIG. 25 is a functional block diagram of the sending communication terminal device according to the third embodiment of the present invention.

FIG. 25 is the block diagram of transmission system 1b. Transmission system 1b includes audio data conversion unit 10b that converts the audio data included in information data, and audio data conversion data output unit 10c that outputs the information about the audio data conversion as audio data conversion data according to the conversion performed by audio data conversion unit 10b.

Audio data conversion unit 10b changes the tone of input audio data by changing the waveform of the input audio data. In the present embodiment the tone of audio data is raised and lowered by changing the frequency of the waveform.

Audio data conversion data output unit 10c converts the amount of conversion performed on audio data into numerical value data within a fixed range, adds a piece of header that indicates that the data is audio data conversion data to each piece of the numerical value data, and outputs the data as audio data conversion data. Audio data conversion data transmission is dealt with by control unit 17 in the same manner as image manipulation data to which code "00" or "01" is added.

In the reception system that receives data from the transmission system whose construction has been explained above, analysis unit 23 and operation control unit 24 handle the audio data conversion data. More specifically, analysis unit 23 analyzes the audio data conversion data and extracts the numerical value data that represents the amount of conversion. Operation control unit 24 has operation unit 25 performs operations corresponding to the analysis result. For instance, when the tone of audio data is raised by audio data conversion unit 10b, operation control unit 24 has operation unit 25 convert symbol image X1 that represents the sending communication terminal device user to a woman according to the change of the tone of voice. When the tone of voice data is lowered, operation control unit 24 has operation unit 25 convert symbol image X1 to a man.

As a result, when audio data conversion data is transmitted and received, it is possible to have the reception system perform operations according to the action performed by the sending communication terminal device user in the same manner as image manipulation data is transmitted and received.

Other possible modifications are given below.
 (1) While each of the communication terminal devices shows the symbol images of the communication terminal device user and its receiving communication terminal device user on the display in the above embodiments, only the symbol image of the receiving communication terminal device user may be shown on the display.
 (2) A photograph image of a user may be used instead of a symbol image. In case of a photograph image, however, the amount of information to be transmitted is larger, so that it will take longer to transmit the image data. Text data may be also used instead of a symbol image. In case of text data, the actions peculiar to a symbol image such as nodding and shaking the head are not shown on the display, and actions such as tearing and crumpling the text data, and turning the page of the text data may be shown instead.
 (3) While three-dimensional image data is used to display a symbol image in the above-described embodiments, animation data that includes all images necessary for the display may be used instead. While the symbol image of a communication terminal device user is transmitted to the other communication terminal device at the beginning of communication in the above-described embodiments, the symbol image may be transmitted every time an action is performed by the user.
 (4) While link information is added to physical quantity data and to the data to be processed with the physical quantity data, or an identifier is added to physical quantity data to indicate the data to be processed with the physical quantity data in the above described embodiments, if physical quantity data and the data to be processed with the physical quantity data are transmitted in order of time, it is not necessary to add link information nor identifier to the data.
 (5) while the vibration or the swing of a communication terminal device is detected as physical quantity data in the above-described embodiments, when a mouse, or a touch pen is attached to the communication terminal device, the vibration or the swing of the mouse or the touch pen may be detected as physical quantity data.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A receiving communication terminal device that receives data transmitted from a sending communication terminal device, comprising:
 a reception means for receiving the data transmitted from the sending communication terminal device;
 a division means for grouping the data transmitted from the sending communication terminal device into a first data that represents physical quantities detected by the sending communication terminal device and a second data that is to be processed with the physical quantities;
 a processing means for processing the second data according to the first data; and
 an expressing means for expressing for a user of the receiving communication terminal device the second data after the processing by the processing means.

2. The receiving communication terminal device according to the claim 1, wherein
 the division means includes a data type judgement unit for detecting identifiers that are added to the data transmitted from the sending communication terminal device, and for distinguishing the first data and the second data based on the detected identifiers.

3. The receiving communication terminal device according to the claim 2, wherein the processing means includes:

an analysis unit for analyzing the first data that affects the sending communication terminal device to detect a type of the physical quantities; and a processing unit for processing the second data according to an analysis result of the analysis unit.

4. The receiving communication terminal device according to the claim 3, wherein the second data obtained from the grouping by the division means includes audio data and image data, the audio data is voice of a user of the sending communication terminal device, the image data is symbol image data that metaphorically represents the user of the sending communication terminal device, the analysis unit analyzes the first data to determine that the physical quantities that affect the sending communication terminal device are for a vibration and or a swing, the processing unit refers to an analysis result of the analysis unit, adds vibrato to the audio data, and shakes a head of the symbol image data of the sending communication terminal device user in one of vertical and horizontal directions, according to the result and the expressing means includes a loudspeaker that emits the audio data after processing by the processing unit and a display that displays the image data after processing by the processing unit.

5. The receiving communication terminal device according to the claim 4, wherein the symbol image data of the sending communication terminal device user is three-dimensional image data, the processing unit includes:

an image data creation unit for creating variations of the image data seen from a plurality of camera angles using the three-dimensional image data; and a selection unit for selectively outputting the variations of the image data one at a time to the display according to the analysis result of the analysis unit.

6. The receiving communication terminal device according to the claim 4 further comprising an oscillation unit, wherein when the physical quantities that affect the sending communication terminal device are for a swing, the oscillation unit is driven and swings the receiving communication terminal device, and when the physical quantities that affect the sending communication terminal device are for a vibration, the oscillation unit is driven and vibrates the receiving communication terminal device.

7. A receiving communication terminal device that receives data transmitted from a sending communication terminal device comprising:

a reception means for receiving the data transmitted from the sending communication terminal device;

a division means for grouping the data transmitted from the sending communication terminal device into a first data that represents physical quantities detected by the sending communication terminal device and a second data that specifies data that is to be processed with the physical quantities;

a storage means for storing the data to be processing;

a processing means for extracting the data that is to be processed and is specified by the second data, and for processing the extracted data according to the first data; and an expressing means for expressing for a user of the receiving communication terminal device the extracted data after the processing by the processing means.

8. The receiving communication terminal device according to the claim 7, wherein the processing means comprises:

an analysis unit for analyzing the first data to detect a type of the physical quantities that affect the sending communication terminal device; and a processing unit for processing the data that is to be processed and is specified by the second data according to an analysis result of the analysis unit.

9. The receiving communication terminal device according to the claim 8, wherein the data that is to be processed and is specified by the second data includes a symbol image data that metaphorically represents a user of the sending communication terminal device, the analysis unit analyzes the first data to determine that the physical quantities that affect the sending communication terminal device are for a vibration and a swing, the processing unit refers to an analysis result of the analysis unit, and shakes a head of the symbol image data of the sending communication terminal device user in one of a vertical and a horizontal directions, and the expressing means is a display for displaying the symbol image data of the sending communication terminal device user after processing by the processing unit.

10. The receiving communication terminal device according to the claim 7, wherein the processing means includes:

an analysis unit for analyzing the first data to determine whether an image manipulation performed on the symbol image data that metaphorically represents the user of the receiving communication terminal device is pressing or stroking; and a processing unit for processing the data that is to be processed and is specified by the second data according to an analysis result of the analysis unit.

11. The receiving communication terminal device according to the claim 10, wherein the data that is to be processed and is specified by the second data is symbol image data that metaphorically represents the user of the receiving communication terminal device, the processing unit processes the symbol image data that metaphorically represents the user of the receiving communication terminal device, according to a type of the image manipulation that is an analysis result of the analysis unit, so that the symbol image data changes an expression to reflect the image manipulation, and the expressing means is a display for displaying the symbol image data of the receiving communication device user after the processing by the processing unit.

12. The receiving communication terminal device according to the claim 11, wherein the symbol image data of the receiving communication terminal device user is three-dimensional image data, the processing unit includes:

an image data creation unit for creating variations of image data seen from a plurality of camera angles using the three-dimensional image data; and a selection unit for selectively outputting the variations of the image data one at a time to the display according to the analysis result of the analysis unit.

13. The receiving communication terminal device according to the claim 11, wherein the symbol image data of the receiving communication terminal device user is animation data, and the processing unit selects predetermined animation data according to the analysis result of the analysis unit, and outputs the predetermined animation data to the display.

14. A receiving communication terminal device that receives data including audio data and video data transmitted from a sending communication terminal device, comprising:

a reception unit for receiving the data transmitted from the sending communication terminal device;

a division unit for grouping the data transmitted from the sending communication terminal device into a first data that represents physical quantities detected by the sending communication terminal device and a second data that is to be processed with the physical quantities;

a processing unit for processing the second data according to the first data; and an expressing unit for expressing for a user of the receiving communication terminal device the second data after the processing by the processing unit.

15. The receiving communication terminal device according to the claim 14, wherein the division unit includes a data type judgment unit for detecting identifiers that are added to the data transmitted from the sending communication terminal device, and for distinguishing the first data and the second data based on the detected identifiers.

16. The receiving communication terminal device according to claim 14, wherein the processing unit includes:

an analysis unit for analyzing the first data that affects the sending communication terminal device to detect a type of the physical quantities; and a processing device for processing the second data according to an analysis result of the analysis unit.

17. The receiving communication terminal device according to the claim 16, wherein the second data obtained from the grouping by the division unit includes audio data and image data, the audit data is a voice of a user of the sending communication terminal device, the image data is symbol image data that metaphorically represents the user of the sending communication terminal device, the analysis unit analyzes the first data to determine that the physical quantities that affect the sending communication terminal device are for a vibration and/or a swing, the processing device refers to an analysis result of the analysis unit, adds vibrato to the audio data, and shakes a head of the symbol image data of the sending communication terminal device user in one of vertical and horizontal directions, according to the result and the expressing means includes a loudspeaker that emits the audio data after processing by the processing unit and a display that displays the image data after processing by the processing unit.

18. The receiving communication terminal device according to the claim 17, wherein the symbol image data of the sending communication terminal device user is three-dimensional image data, the processing device includes:

an image data creation unit for creating variations of the image data seen from a plurality of camera angles using the three-dimensional image data; and a selection unit for selectively outputting the variations of the image data one at a time to the display according to the analysis result of the analysis unit.

19. The receiving communication terminal device according to the claim 17 further comprising an oscillation unit, wherein when the physical quantities that affect the sending communication terminal device are for a swing, the oscillation unit is driven and swings the receiving communication terminal device, and when the physical quantities that affect the sending communication terminal device are for a vibration, the oscillation unit is driven and vibrates the receiving communication terminal device.

* * * * *

UNITED STATES PATENT AND TRADEMARK OFFICE
CERTIFICATE OF CORRECTION

PATENT NO. : 6,522,417 B1  
DATED : February 18, 2003  
INVENTOR(S) : Koji Kakigahara et al.

It is certified that error appears in the above-identified patent and that said Letters Patent is hereby corrected as shown below:

<u>Title page,</u>  
Item [75], should read:  
-- [75] Inventors: Koji Kakigahara, Katano-shi (JP)  
                      Shinichi Matsui, Kobe-shi (JP)  
                      Yasuhiro Sakurai, Nishinomiya-shi (JP) --

Item [56], References Cited, U.S. PATENT DOCUMENTS, should read:  
-- 6,212,381 B1* 4/2001 Oda………………………..455/441 --

Signed and Sealed this

Eighteenth Day of November, 2003

JAMES E. ROGAN  
*Director of the United States Patent and Trademark Office*